US011861072B2

(12) United States Patent
Mutlu et al.

(10) Patent No.: US 11,861,072 B2
(45) Date of Patent: Jan. 2, 2024

(54) SELF-MIXING INTERFEROMETRY-BASED INPUT DEVICE

(71) Applicant: Apple Inc., Cupertino, CA (US)

(72) Inventors: Mehmet Mutlu, Grover Beach, CA (US); Ahmet Fatih Cihan, San Jose, CA (US); Mark T. Winkler, San Jose, CA (US); Tong Chen, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/883,258

(22) Filed: Aug. 8, 2022

(65) Prior Publication Data

US 2022/0382384 A1 Dec. 1, 2022

Related U.S. Application Data

(63) Continuation of application No. 16/934,988, filed on Jul. 21, 2020, now Pat. No. 11,409,365.
(Continued)

(51) Int. Cl.
*G06F 3/01* (2006.01)
*G01S 17/50* (2006.01)

(52) U.S. Cl.
CPC .............. *G06F 3/017* (2013.01); *G01S 17/50* (2013.01); *G06F 3/014* (2013.01)

(58) Field of Classification Search
CPC ........ G06F 3/041; G06F 3/042; G06F 3/0421; G06F 3/0423; G06F 3/0425;
(Continued)

(56) References Cited

U.S. PATENT DOCUMENTS 4,746,770 A 5/1988 McAvinney
5,914,704 A 6/1999 Yamada et al.
(Continued)

FOREIGN PATENT DOCUMENTS

DE 102016211983 1/2018
WO WO 99/030311 6/1999
(Continued)

OTHER PUBLICATIONS

Liess et al., "A miniaturized multidirectional optical motion sensor and input device based on laser self-mixing," Measurement Science and Technology, Institute of Physics Publishing, Bristol, GB, 2002, vol. 13, No. 12, pp. 2001-2006.

*Primary Examiner* — William Lu
(74) *Attorney, Agent, or Firm* — Brownstein Hyatt Farber Schreck, LLP

(57) ABSTRACT

A wearable device includes a device housing configured to be worn on a first surface of a user, a set of one or more SMI sensors, and a processor. The set of one or more SMI sensors is mounted within the device housing and configured to emit a set of one or more beams of electromagnetic radiation, with each beam emitted in a different direction extending away from the first surface. The set of one or more SMI sensors is also configured to generate a set of one or more SMI signals containing information about a relationship between the device housing and a second surface. The processor is configured to extract the relationship between the device housing and the second surface from digitized samples of the set of one or more SMI signals.

20 Claims, 18 Drawing Sheets

US 11,861,072 B2
Page 2

Related U.S. Application Data

(60) Provisional application No. 62/896,801, filed on Sep. 6, 2019.

(58) Field of Classification Search
CPC ...... G06F 3/0426; G06F 3/0428; G06F 3/017; G06F 3/014; G06F 3/0308; G06F 3/0346; G01S 17/50; G01S 7/4812; G01S 7/4913; G01S 7/4915; G01S 17/32; G01S 17/58; G01S 17/87; G01S 17/88; G01S 7/4916
See application file for complete search history.

(56) References Cited

U.S. PATENT DOCUMENTS

| | | | |
|---|---|---|---|
| 6,178,001 B1* | 1/2001 | Kim | H01S 5/0014 356/477 |
| 6,707,027 B2 | 3/2004 | Liess et al. | |
| 7,126,586 B2 | 10/2006 | Jianping et al. | |
| 7,535,578 B2 | 5/2009 | Pril | |
| 7,880,732 B2 | 2/2011 | Goertz | |
| 7,889,171 B2 | 2/2011 | Grunhlke | |
| 8,368,652 B2 | 2/2013 | Lin | |
| 8,416,424 B2* | 4/2013 | Werner | G01S 17/50 356/521 |
| 8,417,309 B2 | 4/2013 | Price | |
| 8,567,257 B2 | 10/2013 | Van Steenberge et al. | |
| 8,727,991 B2 | 5/2014 | Hasgawa-Johnson | |
| 8,945,017 B2 | 2/2015 | Venkatraman et al. | |
| 9,004,698 B2 | 4/2015 | Kilcher et al. | |
| 9,042,477 B2* | 5/2015 | Park | H04L 27/2613 375/267 |
| 9,091,573 B2 | 7/2015 | Van Der Lee et al. | |
| 9,091,747 B2 | 7/2015 | Pruijmboom | |
| 9,397,476 B2 | 7/2016 | Baier et al. | |
| 9,726,474 B2 | 8/2017 | Royo Royo et al. | |
| 9,880,632 B2 | 1/2018 | Ataee et al. | |
| 9,912,923 B2 | 3/2018 | Kilcher et al. | |
| 10,031,588 B2 | 7/2018 | Romano et al. | |
| 10,117,012 B2 | 10/2018 | Saulsbury | |
| 10,126,779 B2 | 11/2018 | von Badinski et al. | |
| 10,231,667 B2 | 3/2019 | Mathew et al. | |
| 10,303,254 B2 | 5/2019 | Pothier | |
| 10,317,940 B2* | 6/2019 | Eim | G06F 1/163 |
| 10,361,887 B2 | 7/2019 | Bhatti et al. | |
| 10,379,028 B2 | 8/2019 | Spruit et al. | |
| 10,401,901 B2* | 9/2019 | Park | G06F 3/011 |
| 10,478,127 B2* | 11/2019 | Sampson | A61B 5/282 |
| 10,502,547 B2* | 12/2019 | Baier | H01S 5/0028 |
| 10,532,943 B2 | 1/2020 | Najafi et al. | |
| 10,579,099 B2 | 3/2020 | Wang et al. | |
| 10,768,693 B2 | 9/2020 | Powderly et al. | |
| 10,838,499 B2 | 11/2020 | Wang et al. | |
| 10,871,820 B2* | 12/2020 | Mutlu | G01B 11/14 |
| 11,063,407 B1* | 7/2021 | Ginzburg | H01S 5/0624 |
| 11,134,901 B2 | 10/2021 | Fine et al. | |
| 11,243,068 B1* | 2/2022 | Mutlu | G01B 9/02003 |
| 11,259,002 B2 | 2/2022 | Le Dortz et al. | |
| 11,409,365 B2 | 8/2022 | Mutlu et al. | |
| 11,419,546 B2 | 8/2022 | Cihan et al. | |
| 11,422,638 B2 | 8/2022 | Mutlu et al. | |
| 11,614,806 B1* | 3/2023 | Cihan | G06F 3/038 345/179 |
| 2002/0104957 A1* | 8/2002 | Liess | G01S 7/4811 250/221 |
| 2005/0078288 A1* | 4/2005 | Pril | G03F 7/70775 355/53 |
| 2006/0227845 A1* | 10/2006 | Degertekin | H04R 23/008 372/102 |
| 2007/0077900 A1* | 4/2007 | Grunhlke | G06F 3/0308 455/90.3 |
| 2007/0181810 A1* | 8/2007 | Tan | G01S 7/4811 250/341.1 |
| 2007/0257718 A1* | 11/2007 | Ruuswik | H04B 15/04 327/156 |
| 2008/0086038 A1* | 4/2008 | Thornton | H01S 3/067 600/310 |
| 2008/0188726 A1* | 8/2008 | Presura | A61B 5/7257 600/322 |
| 2008/0200781 A1* | 8/2008 | Van Herpen | A61B 5/6838 600/316 |
| 2010/0081900 A1* | 4/2010 | Price | A61B 5/14552 600/324 |
| 2010/0134803 A1* | 6/2010 | Baier | H01S 5/0607 356/450 |
| 2010/0165322 A1* | 7/2010 | Kane | G01S 7/481 356/4.01 |
| 2010/0328680 A1 | 12/2010 | Moench et al. | |
| 2011/0105874 A1* | 5/2011 | Feddes | A61B 5/061 600/372 |
| 2012/0120375 A1* | 5/2012 | Kilcher | G01S 7/4814 353/121 |
| 2012/0160031 A1* | 6/2012 | Van Steenberge | G01L 9/0079 257/E33.059 |
| 2012/0200858 A1* | 8/2012 | Pruijmboom | G01B 9/02092 356/477 |
| 2013/0053696 A1* | 2/2013 | Hasegawa-Johnson | A61B 8/02 600/453 |
| 2014/0085635 A1* | 3/2014 | Van Der Lee | G01P 5/26 356/342 |
| 2015/0286293 A1* | 10/2015 | Gruhlke | G06F 3/03542 345/182 |
| 2016/0062473 A1 | 3/2016 | Bouchat et al. | |
| 2016/0120468 A1* | 5/2016 | Mathew | A61B 5/082 600/301 |
| 2016/0320173 A1* | 11/2016 | Royo Royo | G01B 9/0207 |
| 2016/0359290 A1* | 12/2016 | Inaba | G03F 7/70025 |
| 2017/0030708 A1* | 2/2017 | Albert | G01S 17/87 |
| 2017/0085688 A1* | 3/2017 | Zhou | G06F 3/011 |
| 2017/0090581 A1* | 3/2017 | Pothier | G06F 1/1686 |
| 2017/0094389 A1* | 3/2017 | Saulsbury | A61B 5/6803 |
| 2017/0248422 A1* | 8/2017 | Najafi | G01C 25/00 |
| 2017/0293025 A1* | 10/2017 | Davis | G01S 7/023 |
| 2018/0115439 A1* | 4/2018 | Bhatti | G01S 5/0218 |
| 2018/0131880 A1* | 5/2018 | Hicks | G06V 10/145 |
| 2018/0157342 A1* | 6/2018 | Romano | H04N 13/25 |
| 2018/0224368 A1* | 8/2018 | Spruit | G01N 15/06 |
| 2018/0307303 A1* | 10/2018 | Powderly | G06F 3/017 |
| 2018/0310891 A1* | 11/2018 | Fine | A61B 5/6838 |
| 2019/0034072 A1 | 1/2019 | Chiu | |
| 2019/0056498 A1* | 2/2019 | Sonn | G01S 17/931 |
| 2019/0154439 A1* | 5/2019 | Binder | G01B 11/26 |
| 2019/0278091 A1* | 9/2019 | Smits | H04N 13/363 |
| 2019/0285753 A1* | 9/2019 | Spruit | G01S 7/4817 |
| 2019/0324536 A1* | 10/2019 | Forest | G06F 3/016 |
| 2019/0332140 A1* | 10/2019 | Wang | G06F 3/011 |
| 2019/0357771 A1* | 11/2019 | Yu | A61N 5/0613 |
| 2020/0200522 A1* | 6/2020 | Huang | H01S 5/0427 |
| 2020/0264311 A1* | 8/2020 | Le Dortz | G01S 7/4863 |
| 2020/0370879 A1* | 11/2020 | Mutlu | G06F 3/011 |
| 2021/0011559 A1 | 1/2021 | Mutlu et al. | |
| 2021/0072833 A1 | 3/2021 | Mutlu et al. | |
| 2021/0085245 A1 | 3/2021 | Cihan et al. | |
| 2021/0199755 A1* | 7/2021 | Emadi | G01S 7/03 |
| 2022/0345220 A1* | 10/2022 | Shi | H01S 3/1083 |

FOREIGN PATENT DOCUMENTS

| | | |
|---|---|---|
| WO | WO 03/102625 | 12/2003 |
| WO | WO 08/055640 | 5/2008 |
| WO | WO 09/004559 | 1/2009 |

* cited by examiner

SELF-MIXING INTERFEROMETRY-BASED INPUT DEVICE

CROSS-REFERENCE TO RELATED APPLICATION

This application is a continuation of U.S. patent application Ser. No. 16/934,988, filed Jul. 21, 2020, which is a nonprovisional and the claims the benefit under 35 U.S.C. § 119(e) of U.S. Provisional Patent Application No. 62/896,801, filed Sep. 6, 2019, the contents of which are incorporated herein by reference as if fully disclosed herein.

FIELD

The described embodiments generally relate to devices that include self-mixing interferometry (SMI) sensors and, more particularly, to an SMI-based gesture input system including at least one of a wearable device or a handheld device.

BACKGROUND

Sensor systems are included in many of today's electronic devices, including electronic devices such as smartphones, computers (e.g., tablet computers or laptop computers), wearable electronic devices (e.g., electronic watches or health monitors), game controllers, navigation systems (e.g., vehicle navigation systems or robot navigation systems), and so on. Sensor systems may variously sense the presence of objects, distances to objects or proximities of objects, movements of objects (e.g., whether objects are moving, or the speed, acceleration, or direction of movement of objects), and so on.

Given the wide range of sensor system applications, any new development in the configuration or operation of a sensor system can be useful. New developments that may be particularly useful are developments that reduce the cost, size, complexity, part count, or manufacture time of the sensor system, or developments that improve the sensitivity or speed of sensor system operation.

SUMMARY

Embodiments of the systems, devices, methods, and apparatus described in the present disclosure are directed to the configuration and operation of an SMI-based gesture input system that includes one or more SMI sensors. The SMI sensor(s) may be used to determine a relationship between a wearable or handheld device and a surface, or a relationship between a wearable device and a handheld device, or a relationship between different wearable devices or different handheld devices. The relationship(s) may include a characterization of one or more of position, orientation, or motion of a wearable or handheld device with respect to a surface (or surfaces). In some cases, the relationship(s) may be used to identify one or more gestures made by a user of the SMI-based gesture input system.

An SMI sensor is defined herein as a sensor configured to generate electromagnetic radiation (e.g., light), emit the electromagnetic radiation from a resonant cavity (e.g., a resonant optical cavity), receive a reflection or backscatter of the electromagnetic radiation (e.g., electromagnetic radiation reflected or backscattered from a surface, or an object having a surface (collectively referred to herein as a surface) back into the resonant cavity, coherently or partially coherently self-mix the generated and reflected/backscattered electromagnetic radiation within the resonant cavity, and produce an output indicative of the self-mixing (i.e., an SMI signal). The generated, emitted, and received electromagnetic radiation may be coherent or partially coherent. In some examples, the electromagnetic radiation emitted by an SMI sensor may be generated by an electromagnetic radiation source such as a vertical-cavity surface-emitting laser (VCSEL), a vertical external-cavity surface-emitting laser (VECSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge-emitting LED), and so on. The generated, emitted, and received electromagnetic radiation may include, for example, visible or invisible light (e.g., green light, infrared (IR) light, ultraviolet (UV) light, and so on). The output of an SMI sensor (i.e., the SMI signal) may include a photocurrent produced by a photodetector (e.g., a photodiode), which photodetector is integrated with, or positioned under, above, or next to, the sensor's electromagnetic radiation source. Alternatively or additionally, the output of an SMI sensor may include a measurement of the current or junction voltage of the SMI sensor's electromagnetic radiation source.

In a first aspect, the present disclosure describes a wearable device having a device housing configured to be worn on a first surface of a user, a set of one or more SMI sensors, and a processor. The set of one or more SMI sensors may be mounted within the device housing and configured to emit a set of one or more beams of electromagnetic radiation, with each beam emitted in a different direction extending away from the first surface. The set of one or more SMI sensors may also be configured to generate a set of one or more SMI signals containing information about a relationship between the device housing and a second surface. The processor may be configured to extract the relationship between the device housing and the second surface from digitized samples of the set of one or more SMI signals.

In another aspect of the disclosure, the present disclosure describes a gesture input system. The gesture input system includes a wearable device configured to be worn by a user, and an object configured to be held by the user. The gesture input system also includes a set of one or more SMI sensors and a processing system. Each SMI sensor may be mounted within the wearable device or the object, and may be configured to emit a beam of electromagnetic radiation, and generate an SMI signal. The processing system may be housed within at least one of the wearable device or the object, and may be configured to receive a set of one or more SMI signals from the set of one or more SMI sensors. The processing system may also be configured to extract, from the set of one or more SMI signals, information about at least one of: a time-varying relationship between the wearable device and the object, or a time-varying relationship between the wearable device and a surface other than a surface of the object.

In another aspect, the present disclosure describes a method of identifying a type of gesture. The method may include emitting a beam of electromagnetic radiation from each SMI sensor in a set of one or more SMI sensors disposed in a wearable device; sampling an SMI signal generated by each SMI sensor to produce a time-varying sample stream for each SMI sensor; determining, using a processor of the wearable device and the time-varying sample stream of at least one SMI sensor in the set of one or more SMI sensors, a movement of the wearable device with respect to a surface; and transmitting information indicative of the movement of the wearable device from the wearable device to a remote device.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
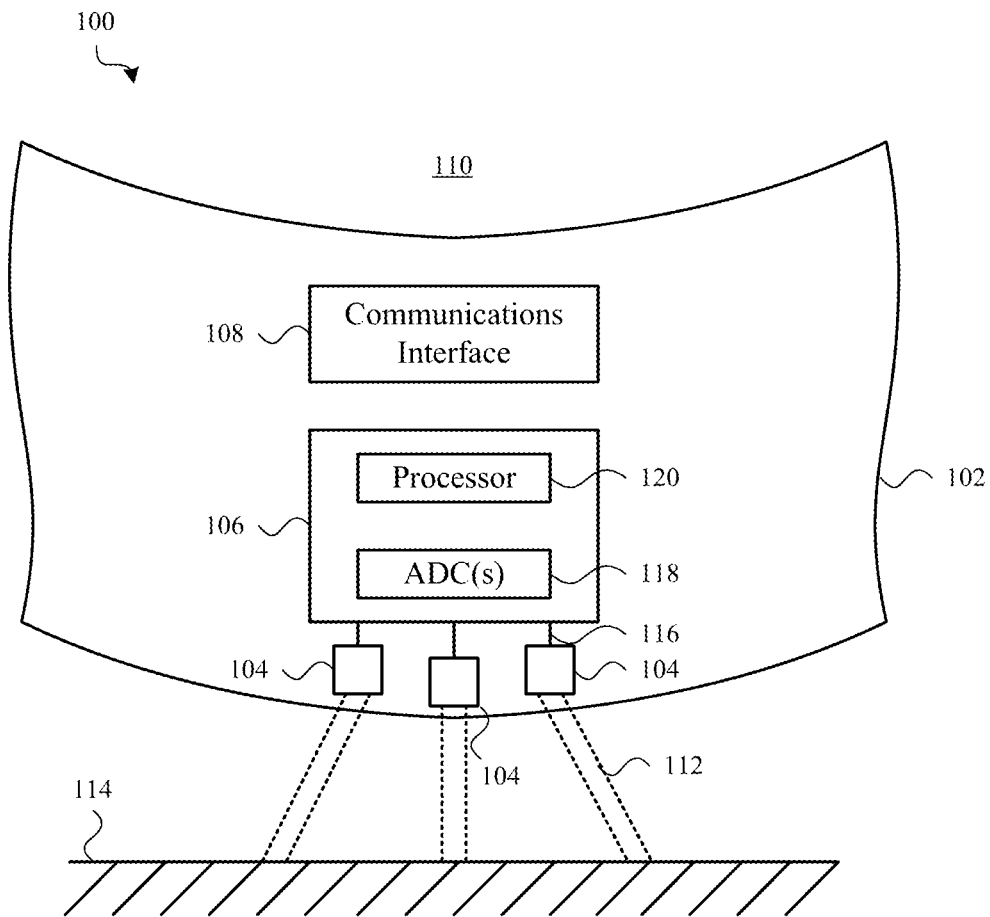
FIG. 1 shows an example SMI-based gesture input system that includes a wearable device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following description relates to the configuration and operation of SMI-based gesture input systems—i.e., systems that can identify gestures made by a user using signals received from one or more SMI sensors. An SMI sensor can be used to optically measure the relative motion (displacement) between the SMI sensor and a target (e.g., a surface or object), with sub-wavelength resolution. When displacement measurements are associated with measurement times, the velocity of the target may also be measured. Furthermore, by modulating the SMI sensor with a known wavelength modulation (e.g., a triangular modulation), the absolute distance from the SMI sensor to the target may be measured.

In augmented reality (AR), virtual reality (VR), and mixed reality (MR) applications, as well as other applications, it can be useful to track a user's finger movement(s) and/or identify a user's gestures (e.g., gestures made with one or more fingers, a hand, an arm, etc.). In some applications, it is useful for a user to be able to provide input to a system by interacting with a surface (e.g., making a gesture on any random surface, such as a tabletop, wall, or piece of paper), or by making a gesture in free space. In such applications, an SMI-based gesture input system may be used to track a user's finger movements with reference to any surface, including, in some cases, the surface of another finger, the user's palm, and so on.

Described herein are SMI-based gesture input systems and devices that can be worn or held by a user. Some of the systems include a singular wearable or handheld device. Other systems may include two or more wearable and/or handheld devices. The systems may be provided with more or fewer SMI sensors, which generally enable finer or lower resolution tracking, or more or less complex gesture detection/identification. For example, with one SMI sensor, scrolling along a single axis may be detected. With two SMI sensors, user motion in a plane may be tracked. With three or more SMI sensors, movements in x, y, and z directions may be tracked. Motion tracking with six degrees of freedom may also be tracked with three or more SMI sensors, and in some cases, by modulating the SMI sensors in particular or different ways.

In comparison to traditional optical tracking methods, such as optical flow and speckle tracking, an SMI-based tracking method can reject ambient light (e.g., sunlight or other ambient light) and track motion with six degrees of freedom without a need for a supplemental sensor for determining the distance to a target surface. An SMI-based gesture input system can also be used in a dark room (e.g., a room with no ambient light).

These and other techniques are described with reference to FIGS. 1-14. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "beneath", "left", "right", etc. may be used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

FIG. 1 shows an example SMI-based gesture input system 100. The system 100 includes a device housing 102, a set of one or more SMI sensors 104 mounted within the device housing 102, a processing system 106 mounted within the device housing 102, and/or a communications interface 108 mounted within the device housing 102.

The device housing 102 may take various forms, and in some cases may be configured to be worn or held by a user 110. When the device housing 102 is configured to be worn by a user 110, the device housing 102 may define a wearable device such as a finger ring, a full or partial glove, a sleeve, etc. When the device housing 102 is configured to be held by a user 110, the device housing 102 may define a stylus, another writing implement (e.g., a pen or a pencil), an arbitrary object, etc. In any case, the device housing 102 may be made from various materials, such as plastic, metal, or ceramic materials. The device housing 102 may in some cases include multiple parts, such as first and second rings that snap together or are otherwise fastened (e.g., by adhesive or solder), first and second half-circle tubes that snap together or are otherwise fastened (e.g., by adhesive or solder), or one or more pieces defining an open partial circle, which open partial circle has one or more open ends plugged by a cap.

Each of the SMI sensors 104 may include an electromagnetic radiation source. The electromagnetic radiation source may include a resonant cavity from which a beam of electromagnetic radiation 112 is emitted. The beam of electromagnetic radiation 112 may include a coherent (or partially coherent) mix of 1) electromagnetic radiation generated by the electromagnetic radiation source, and 2) electromagnetic radiation that is received into the resonant cavity of the electromagnetic radiation source after reflecting or backscattering from a surface 114. Each of the SMI sensors 104 may include a photodetector that generates an SMI signal 116 containing information about a relationship between the SMI sensor 104 and the surface 114. The SMI signal 116 generated by an SMI sensor 104 contains information corresponding to information contained in the electromagnetic radiation waveform received by the SMI sensor 104. Alternatively, an SMI sensor 104 may output, as an SMI signal 116, a measurement of the current or junction voltage of its electromagnetic radiation source.

The one or more SMI sensors 104 may emit a set of one or more beams of electromagnetic radiation 112. Different beams 112 may be emitted in different directions. In some cases, some or all of the beams 112 may be emitted in directions that extend away from a first surface of the user 110 (e.g., away from a surface of the user 110 on which the device housing 102 is worn). Some (or all) of the beams 112 may be emitted toward a second surface (e.g., the surface 114). The SMI signals 116 generated by the set of one or more SMI sensors 104 may not only contain information about the relationships between individual SMI sensor(s) 104 and the surface 114, but information about a relationship between the device housing 102 and the surface 114, and thus information about a position, orientation, or movement of the user 110 that is wearing or holding the device housing 102.

The processing system 106 may include, for example, one or more analog-to-digital converters 118 (ADCs) for digitizing the SMI signals 116 output by the SMI sensors 104 (e.g., an ADC 118 per SMI sensor 104), a processor 120, and/or other components). The processing system 106 may in some cases include filters, amplifiers, or other discrete circuits for processing the SMI signal(s) 116. The processor 120 may take various forms, such as that of a microprocessor, microcontroller, application-specific integrated circuit (ASIC), and so on).

The processor 120 may be configured to extract the relationship between the device housing 102 and the surface 114 from digitized samples of the one or more SMI signals 116. When the system 100 includes only one SMI sensor 104, or when the processor 120 uses only one SMI signal 116, the processor 120 may determine, for example, motion of the device housing 102 (and thus a motion of the user 110) along an axis of the SMI sensor's emitted beam 112 (e.g., in an x, y, or z direction of a Cartesian coordinate system). When the system 100 includes only two SMI sensors 104, or when the processor 120 uses only two SMI signals 116, the processor 120 may determine, for example, motion of the device housing 102 (and thus a motion of the user 110) in a plane (e.g., in an xy, xz, or yz plane of a Cartesian coordinate system, assuming the beams 112 are tilted (i.e., not perpendicular or parallel to) the plane). When the system 100 includes only at least three SMI sensors 104, or when the processor 120 uses at least three SMI signals 116, the processor 120 may determine, for example, motion of the device housing 102 (and thus a motion of the user 110) in free space (e.g., in an xyz space of a Cartesian coordinate system).

When the system 100 includes two or three SMI sensors 104, the beams 112 emitted by the SMI sensors 104 preferably have orthogonal axes, which decouple the SMI signals 116 to improve sensitivity and minimize error, and which simplify the processing burden (i.e., computation burden) placed on the processor 120. However, the beams 112 need not have orthogonal axes if the angles between the beams 112 and direction(s) of displacement being measured is/are known. When the system 100 generates more SMI signals 116 than are needed by the processor 120, or when the system 100 includes more than three SMI sensors 104, the processor 120 may analyze digitized samples of multiple SMI signals 116, and identify (based at least in part on the analyzing) at least one of the multiple SMI signals 116 from which to extract the relationship between the device housing 102 and the surface 114. In the latter case, it is acknowledged that the device housing 102 may in some cases be positioned in different ways, such that its SMI sensors 104 may emit beams of electromagnetic radiation 112 in directions that are not useful, or in directions that result in different beams 112 impinging on different surfaces. The processor 120 may therefore analyze the digitized samples of multiple SMI signals 116 to determine which SMI signals 116 seem to contain useful information about the same surface (e.g., the processor 120 may be programmed to assume that SMI signals 116 indicating that a surface is within a threshold distance are being generated by SMI sensors 104 facing toward a user's palm or other nearby body part, and then ignore these SMI signals 116). Alternatively, the system's user 110 may position the device housing 102 so that its SMI sensors 104 emit beams of electromagnetic radiation 112 in useful directions.

In some embodiments, the processor 120 may be configured to transmit information indicating the relationship between the device housing 102 and the surface 114 using the communications interface 108. The information may be transmitted to a remote device. In some cases, the transmitted information may include a sequence of time-dependent measurements, or a sequence of time-dependent positions, orientations, or movements. In other cases, the processor 120 may be configured to identify one or more gestures made by the user 110 and transmit indications of the one or more gestures (which indications are a form of information indicating the relationship between the device housing 102 and the surface 114). The processor 120 may identify a gesture of the user 110 by comparing a sequence of changes in one or more SMI signals 116 obtained from one or more SMI sensors 104 to one or more stored sequences that have been associated with one or more gestures. For example, the processor 120 may compare a sequence of changes in an SMI signal 116 to a stored sequence corresponding to a press or lunge, and upon determining a match (or that the sequences are similar enough to indicate a match), the processor 120 may indicate that the user 110 has made a press or lunge gesture. Similarly, upon comparing sequences of changes in a set of SMI signals 116 to a stored set of sequences corresponding to the user 110 writing a letter "A," or to a stored set of sequences corresponding to the user 110 making a circular motion, and determining a match to one of these gestures, the processor 120 may indicate that the user 110 has drawn a letter "A" or made a circular gesture. In addition to or in lieu of comparing sequences of changes in one or more SMI signals 116 to stored sequences of changes, the processor 120 may determine, from the sequence(s) of changes in or more SMI signals 116, a set of time-dependent positions, orientations, movement vectors, or other pieces of information, in 1-, 2-, or 3-dimensions, and may compare this alternative information to stored information that has been associated with one or more predetermined gestures.

When determining motion of the device housing 102 with respect to the surface 114, there is ambiguity between displacement and rotation when using only three sequences of time-dependent measurements. This is because characterization of motion, in a Cartesian coordinate system, requires characterization of six degrees of freedom (6 DoF). Characterization of 6 DoF requires characterization of six unknowns, which consequently requires six sequences of time-dependent measurements—e.g., not only measurements of displacement along three axes (x, y, and z axes), but rotation about each of the three axes (e.g., yaw, pitch, and roll). In other words, the processor 120 cannot solve for six unknowns using only three sequences of time-dependent measurements. To provide three additional sequences of time-dependent measurements, the processor 120 may use SMI signals 116 obtained by six different SMI sensors 104, which emit beams 112 directed in six different directions toward the surface 114. Alternatively, the processor 120 may obtain two or more sequences of time-dependent measurements, from each SMI sensor 104 in a smaller number of SMI sensors 104. For example, the processor 120 may alternately modulate an input of each SMI sensor 104, in a set of three SMI sensors 104, using a sinusoidal waveform and a triangular waveform, and obtain a sequence of time-dependent measurements for each type of modulation from each of the three SMI sensors 104 (e.g., the processor 120 may modulate an input of each SMI sensor 104 using a sinusoidal waveform during a first set of time periods, and modulate the input of each SMI sensor 104 using a triangular waveform during a second set of time periods). Modulation of the inputs using the triangular waveform can provide an absolute distance measurement, which may not be obtainable using sinusoidal waveform modulation.

The communications interface 108 may include a wired and/or wireless communications interface (e.g., a Bluetooth®, Bluetooth® Low Energy (BLE), Wi-Fi, or Universal Serial Bus (USB) interface) usable for communications with a remote device (e.g., a mobile phone, electronic watch, tablet computer, or laptop computer).

Figure 2:
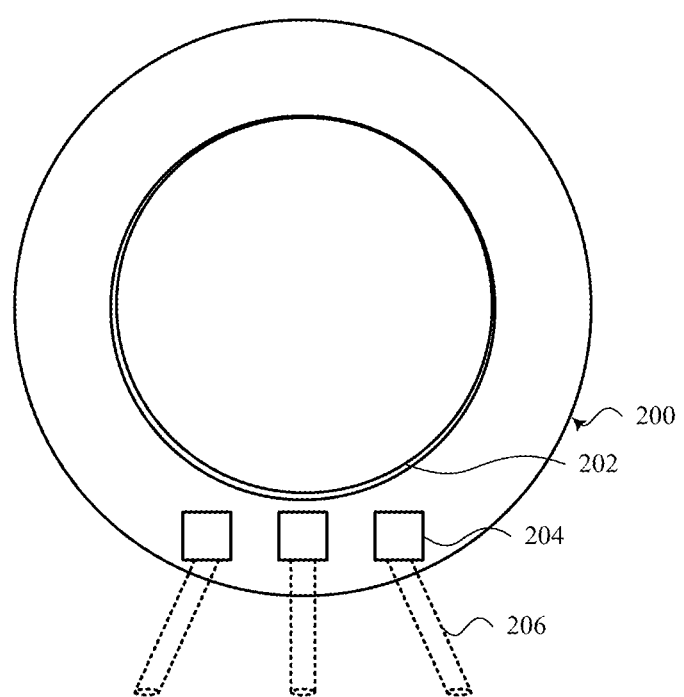
FIGS. 2 and 3 show additional examples of SMI-based gesture input systems including a wearable device.
Figure 3:
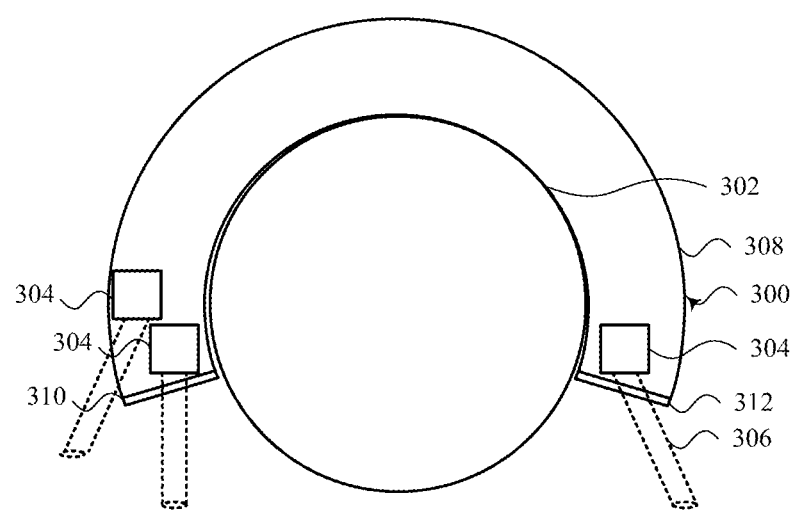

FIGS. 2 and 3 show examples of SMI-based gesture input systems, which systems may be embodiments of the system described with reference to FIG. 1. FIG. 2 shows an example SMI-based gesture input system that takes the form of a closed ring 200. The closed ring 200 may be configured to receive a user's finger 202 (i.e., the closed ring 200 may be a finger ring). A set of SMI sensors 204 housed within the closed ring 200 may emit beams of electromagnetic radiation 206 through apertures and/or window elements that are transparent to the wavelength(s) of the emitted beams 206. By way of example, the closed ring 200 includes three SMI sensors 204 that emit orthogonal beams of electromagnetic radiation 206. In alternative embodiments, the closed ring 200 may include more or fewer SMI sensors 204 that emit orthogonal or non-orthogonal beams of electromagnetic radiation 206.

FIG. 3 shows an example SMI-based gesture input system that takes the form of an open ring 300. The open ring 300 may be configured to receive a user's finger 302 (e.g., the open ring 300 may be a finger ring). The open ring 300 may include SMI sensors 304 that are disposed to emit beams of electromagnetic radiation 306 from along its ring body 308 and/or from one or both ends 310, 312 of its ring body 308 (e.g., from a cap at an end 310, 312 of its ring body 308). By way of example, the open ring 300 includes three SMI sensors 304 that emit orthogonal beams of electromagnetic radiation 306. In alternative embodiments, the open ring 300 may include more or fewer SMI sensors 304 that emit orthogonal or non-orthogonal beams of electromagnetic radiation 306. Although the SMI sensors 304 are shown near both ends 310, 312 of the open ring 300 in FIG. 3, all of the SMI sensors 304 (or more or fewer SMI sensors 304) may alternatively be disposed near one end of the open ring 300.

An open ring, as shown in FIG. 3, can be useful in that it may not obstruct the inner surfaces of a user's hand, which in some cases may improve the user's ability to grip an object, feel a texture on a surface, or receive a haptic output provided via a surface.

In some embodiments, the wearable device described with reference to any of FIGS. 1-3 may determine the absolute distance, direction, and velocity of a surface with respect to an SMI sensor by triangularly modulating an input to the SMI sensor, as described with reference to FIGS. 10 and 11. Displacement of the surface may then be obtained by integrating velocity. In some embodiments, the wearable device can determine displacement and direction of the surface with respect to an SMI sensor (in the time domain) using I/Q demodulation, as described with reference to FIG. 12. Absolute distance can then be obtained using triangular modulation.

In some cases, a wearable device such as a finger ring may include a deformable or compressible insert that enables the finger ring to be worn farther from, or closer to, a user's fingertip.

In some cases, a finger ring may be rotated by a user, so that it may alternately sense a surface below a user's hand, a surface of an object held by the user, an adjacent finger, and so on.

In some cases, a wearable device may include sensors in addition to SMI sensors, such as an inertial measurement unit (IMU). In some cases, the additional sensor(s) may also be used to characterize motion. A wearable device may also contain a haptic engine to provide haptic feedback to a user, a battery, or other components.

Figure 4:
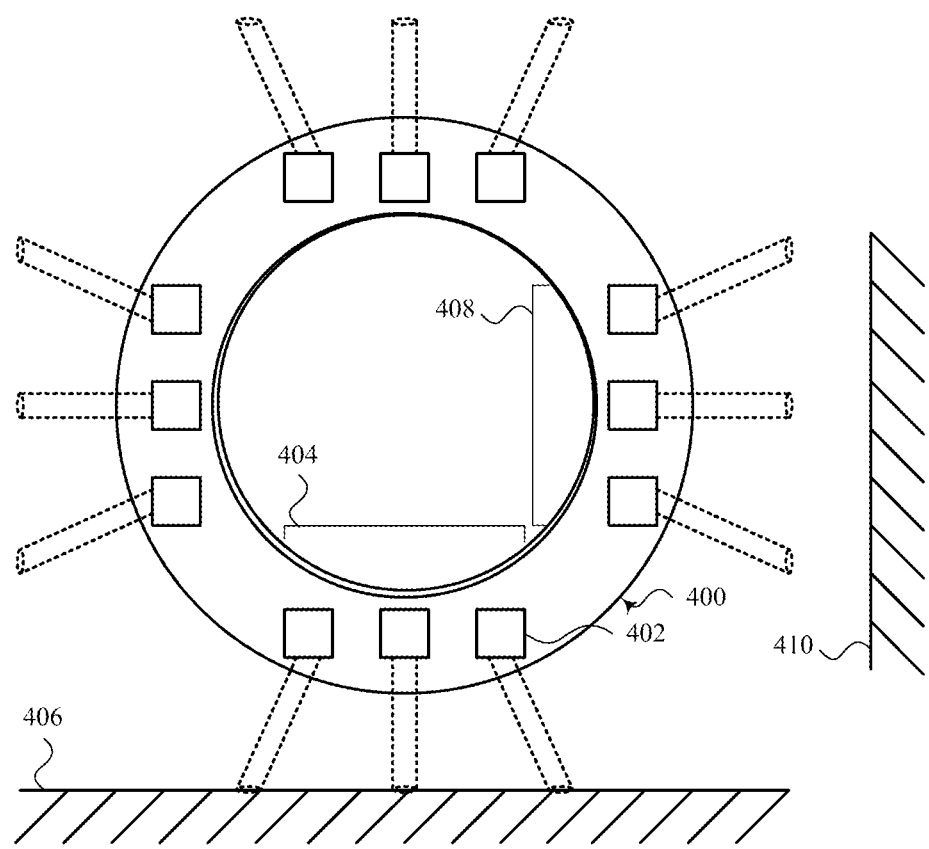
FIG. 4 shows a wearable device having a set of SMI sensors, from which a processor of the device may select a subset of SMI sensors to determine a relationship between the wearable device and a surface.

FIG. 4 shows a wearable device 400 having a set of SMI sensors 402 from which a processor of the device 400 may select a subset 404 to determine a relationship between the wearable device 400 and a surface 406. Alternatively, a processor of the device 400 may use SMI signals generated by different subsets 404, 408 of the SMI sensors 402 to determine relationships between the wearable device 400 and different surfaces 406, 410 (e.g., a tabletop 406 and a finger 410 of the user adjacent the finger on which the device 400 is worn). By way of example, the wearable device 400 is shown to be a closed finger ring (e.g., a wearable device having a form factor similar to the form factor of the closed ring described with reference to FIG. 2). In alternative embodiments, the device 400 may take other forms.

In FIG. 4, the SMI sensors 402 are grouped in subsets of three SMI sensors 402, and the subsets are located at different positions around the circumference of the device 400. In other embodiments, the subsets of SMI sensors 402 may have different numbers of SMI sensors 402 (including only one SMI sensor 402, in some cases). In some embodiments, the SMI sensors 402 may not be arranged in discrete subsets, and a processor of the device 400 may analyze SMI signals received from the SMI sensors 402 and dynamically identify one or more subsets of SMI sensors 402 in response to analyzing the SMI signals. The processor may also determine that one or more of the SMI sensors are not generating useful SMI signals and exclude those SMI sensors from inclusion in any subset (and in some cases, may not use those SMI sensors until a change in their SMI signals is identified).

In some embodiments of the device 400 (or in embodiments of other devices described herein), the device 400 may include one or more sensors for determining an orientation of the device 400 with respect to its user (e.g., with respect to the finger on which the device 400 is worn, one or more adjacent fingers, the user's palm, and so on) or a surface (e.g., a tabletop, piece of paper, wall, surface of the user's body, and so on). The sensors may include, for example, one or more of proximity sensors, contact sensors, pressure sensors, accelerometers, IMUs, and so on.

Figure 5:
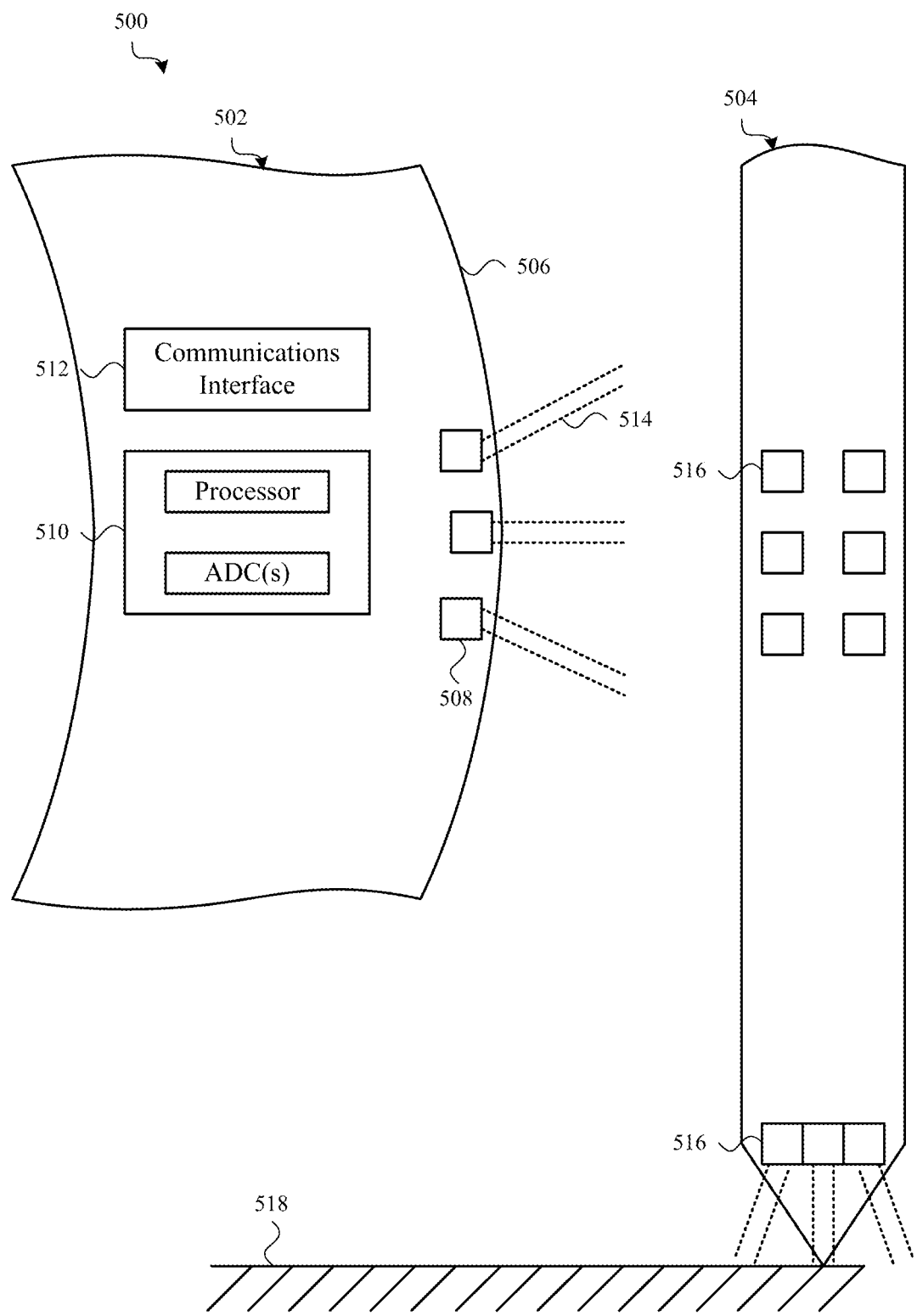
FIG. 5 shows another example SMI-based gesture input system, which system includes more than one device.

FIG. 5 shows another example SMI-based gesture input system 500. In contrast to the system described with reference to FIG. 1, the system 500 may include more than one device. For example, the system 500 may include a wearable device 502 that is configured to be worn by a user, and an object 504 that is configured to be held by the user.

In some embodiments, the wearable device 502 may be constructed similarly to the wearable device described with reference to FIG. 1, and may include a device housing 506, a set of one or more SMI sensors 508 mounted within the device housing 506, a processing system 510 mounted within the device housing 506, and/or a communications interface 512 mounted within the device housing 102. The device housing 506, SMI sensors 508, processing system 510, and/or communications interface 512 may be configured similarly to the same components described with reference to FIG. 1. In some embodiments, the wearable device 502 may be a finger ring, as described, for example, with reference to FIG. 2 or 3.

In some embodiments, the object 504 may be shaped as one or more of a stylus, a pen, a pencil, a marker, or a paintbrush. The object 504 may also take other forms.

In some cases, one or more of the SMI sensors 508 in the wearable device 502 may emit beams of electromagnetic radiation 514 that impinge on the object 504. As the object 504 is moved by the user, such as to write or draw, a relationship between the wearable device 502 and the object 504 may change. The processing system 510 may extract information about the time-varying relationship between the wearable device 502 and the object 504 (and/or information about a time-varying relationship between the wearable device 502 and a surface other than a surface of the object 504), from the SMI signals of the SMI sensors 508, and in some cases may identify one or more gestures made by the user. In some cases, the gestures may include a string of alphanumeric characters (one or more characters) written by the user. In these cases, the processing system 510 may be configured to identify, from the information about the time-varying relationship between the wearable device 502 and the object 504, the string of alphanumeric characters. The SMI sensors 508 may also or alternatively be used to determine whether a user is holding the object 504, as well as to track or predict motion of the object 504. For example, if the object 504 is a writing implement (e.g., a pen), the SMI signals generated by the SMI sensors 508 can be analyzed to determine whether a user is holding the object 504, and in some cases whether the user is holding the object 504 loosely or tightly. The processing system 510 can determine from the presence of the object 504, and/or the user's grip and/or movement of the object 504, whether the user is about to write, gesture, etc. The processing system 510 can then fully wake the wearable device 502 in response to the presence, grip, and/or movement of the object 504; or begin recording motion of the object 504 and/or identifying letters, gestures, and so on made by the user with the object 504. In some embodiments, the processing system 510 may switch the wearable device 502 to a first mode, in which the SMI sensors 508 are used to track movement with respect to a tabletop or the user, when the object 504 is not detected; and switch the wearable device 502 to a second mode, in which the SMI sensors 508 are used to track movement of the object 504, when the object 504 is detected. In some embodiments, the SMI sensors 508 may track motion of the object 504 by tracking motion of the wearable device 502 with respect to a tabletop or other surface (i.e., a surface other than a surface of the object 504). This is because the user's holding of the object 504 may influence how the user holds their hand or moves their finger, which hand/finger positions or movements with respect to a non-object surface may be indicative of how the user is moving the object 504 (e.g., indicative of the letters or gestures the user is making with the object 504). In some cases, the wearable device 502 may effectively turn any object, including a dumb or non-electronic object, into a smart pen or the like.

In some cases, the wearable device 502 may have relatively more SMI sensors 508, as described, for example, with reference to FIG. 4. In some cases, the object 504 may have one or more SMI sensors 516 therein, in addition to the wearable device 502 having one or more SMI sensors 508 therein. When provided, the SMI sensors 516 may be used similarly to the SMI sensors 508 included in the wearable device 502, and may determine a relationship of the object 504 to the wearable device, the user's skin (i.e., a surface of the user), or a remote surface (e.g., the surface 518). The SMI sensors 516 may be positioned along the body of the object 504 (e.g., proximate where a user might hold the object 504) or near a tip of the object 504 (e.g., proximate a pointing, writing, or drawing tip) of the object 504. In some embodiments, the object 504 may include a processing system and/or communications interface for communicating SMI signals generated by the SMI sensors 516, or information related to or derived therefrom, to the wearable device 502. Alternatively or additionally, the processing system and/or communications interface may receive SMI signals, or information related to or derived therefrom, from the wearable device 502. The wearable device 502 and object 504 may communicate wirelessly, or may be connected by an electrical cord, cable, and/or wire(s). In some embodiments, the processing system 510 of the wearable device 502 may bear most of the processing burden (e.g., identifying gestures). In other embodiments, the processing system of the object 504 may bear most of the processing burden, or the processing burden may be shared. In other embodiments, the object 504 may include all of the system's SMI sensors and processing system.

Figure 6:
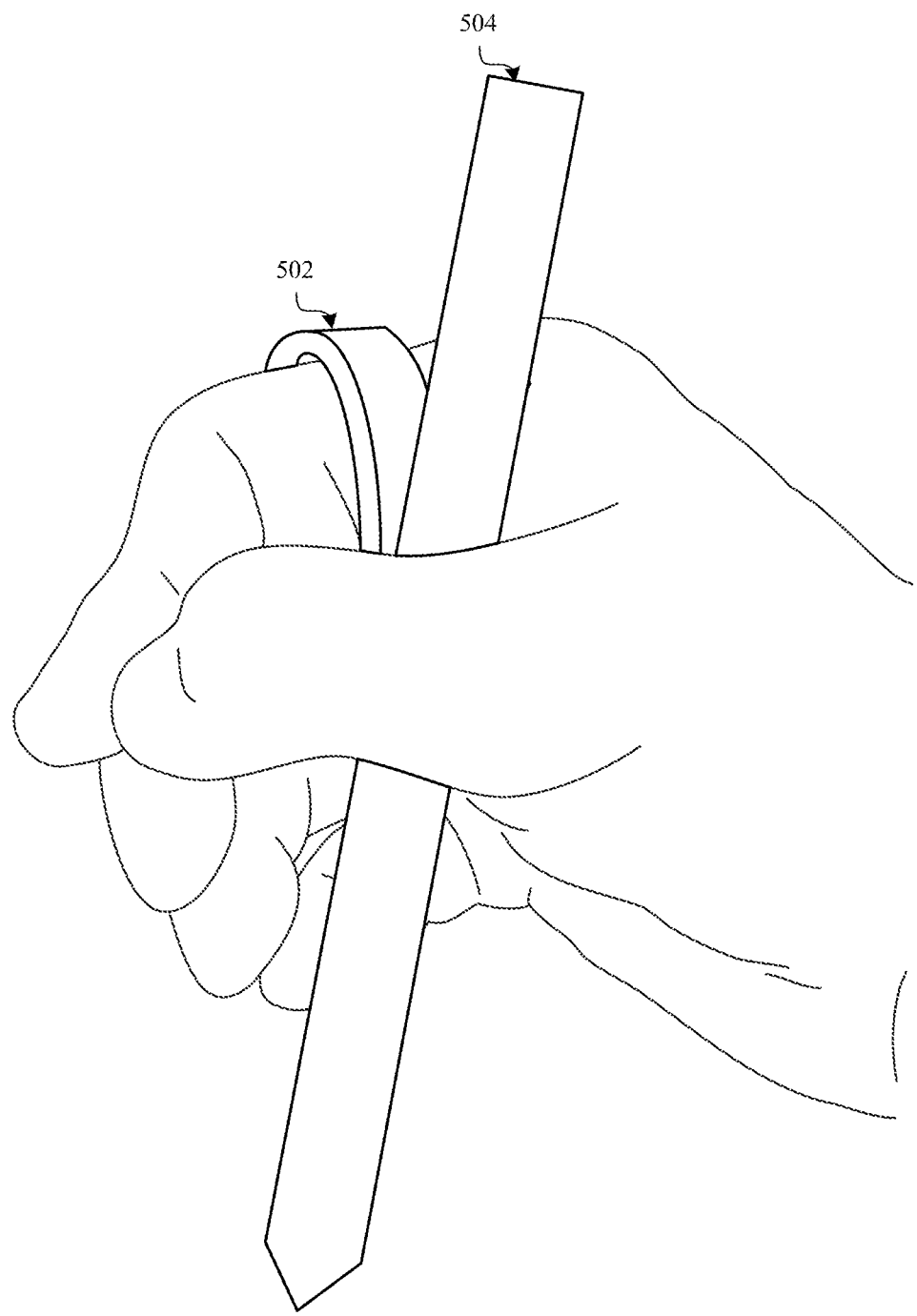
FIG. 6 shows an example of the system described with reference to FIG. 5, in which the wearable device is a finger ring and the object is shaped as one or more of a stylus, a pen, a pencil, a marker, or a paintbrush.

FIG. 6 shows an example of the system described with reference to FIG. 5, in which the wearable device 502 is a finger ring and the object 504 is shaped as one or more of a stylus, a pen, a pencil, a marker, or a paintbrush.

Figure 7:
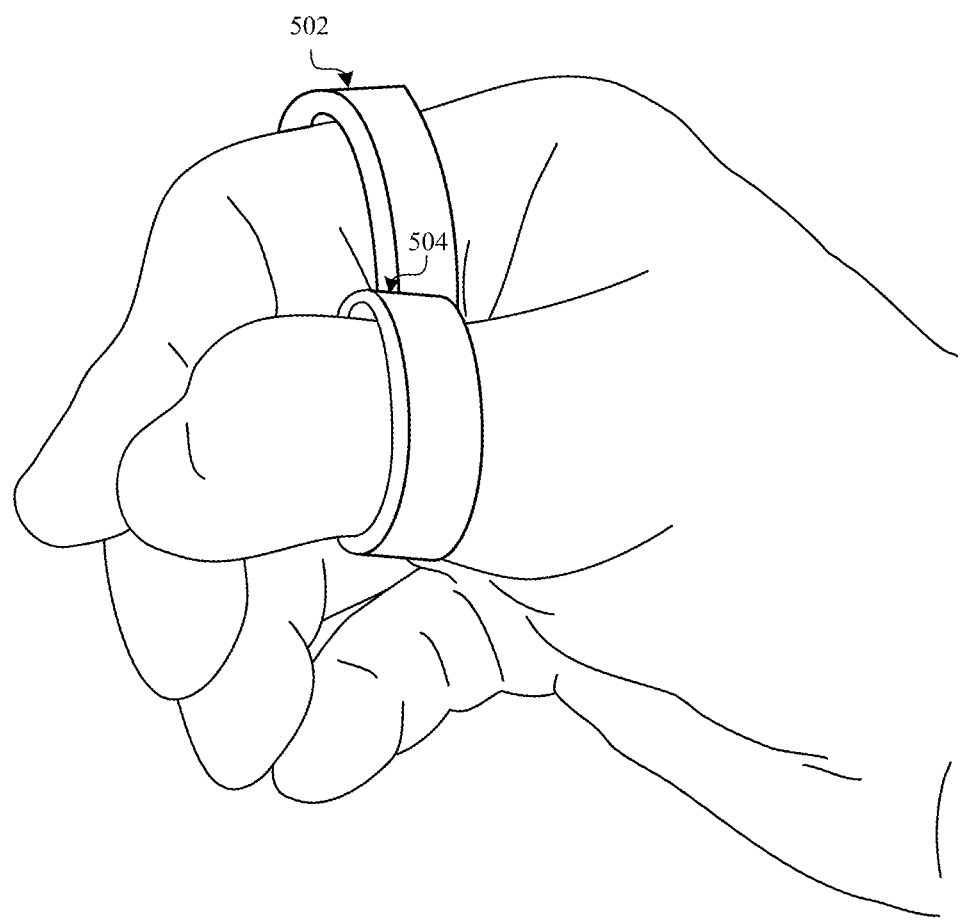
FIG. 7 shows an alternative embodiment of the system described with reference to FIG. 5, in which the object is also a wearable device.

In some cases, an SMI-based gesture input system may include more than one wearable device and/or more than one handheld device. For example, FIG. 7 shows an alternative embodiment of the system described with reference to FIG. 5, in which the object 504 is also a wearable device. By way of example, both the wearable device 502 and the object 504 are shown to be finger rings. Finger rings worn on a user's thumb and index finger, for example, may be used to identify gestures such as a pinch, zoom, rotate, and so on.

An SMI-based gesture input system, such as one of the systems described with reference to FIGS. 1-7, may in some cases be used to provide input to an AR, VR, or MR application. An SMI-based gesture input system may also be used as an anchor for another system. For example, in a camera-based gesture input system, it is difficult to determine whether the camera or a user's hand (or finger) is moving. An SMI-based gesture input system may replace a camera-based gesture input system, or may provide anchoring information to a camera-based gesture input system.

Figure 8A:
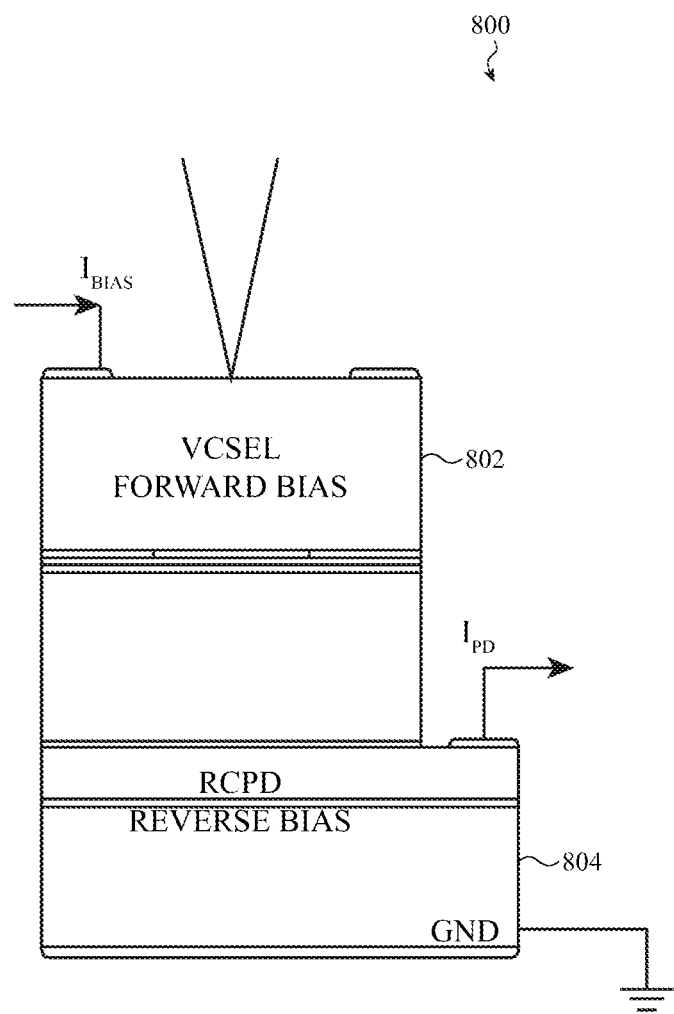
FIGS. 8A-8D show example SMI sensors that may be used in one or more of the SMI-based gesture input systems described with reference to FIGS. 1-7.

FIG. 8A shows a first example SMI sensor 800 that may be used in one or more of the SMI-based gesture input systems described with reference to FIGS. 1-7. In this example, the SMI sensor 800 may include a VCSEL 802 with an integrated resonant cavity (or intra-cavity) photodetector (RCPD) 804.

Figure 8B:
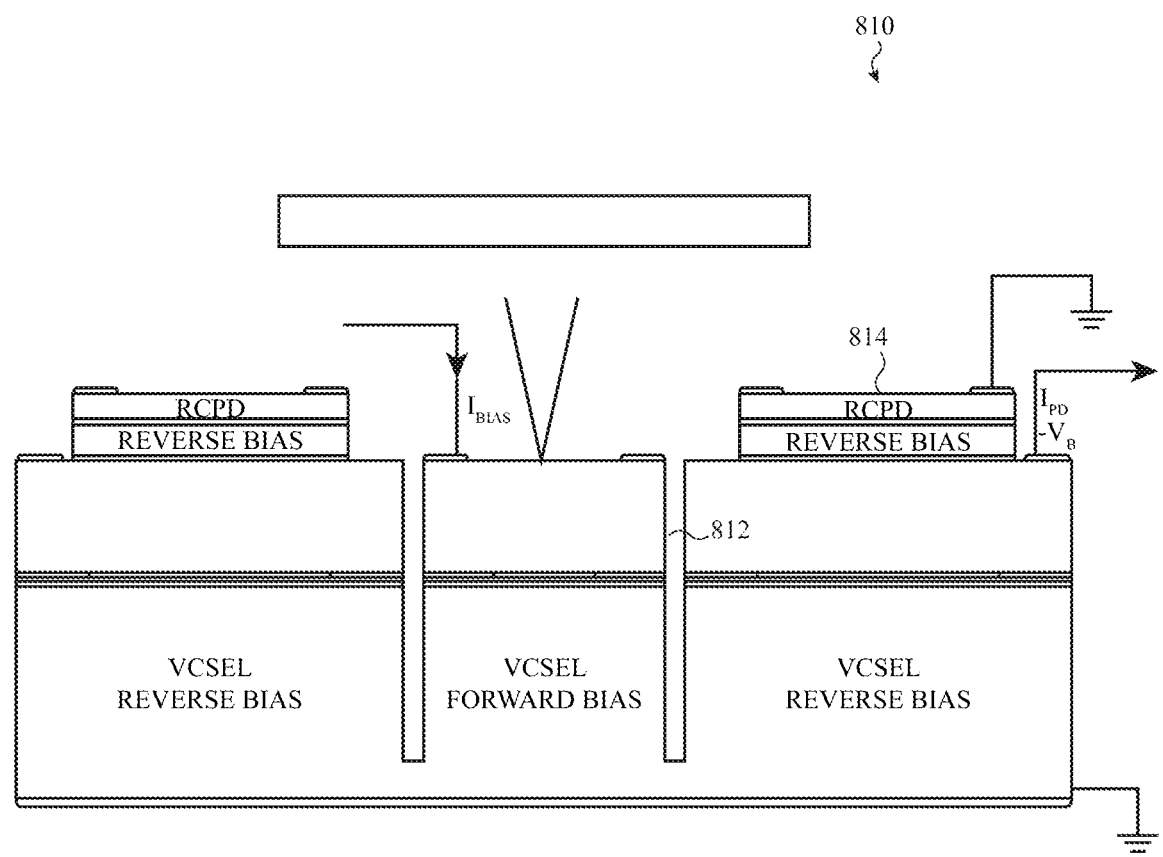

FIG. 8B shows a second example SMI sensor 810 that may be used in one or more of the SMI-based gesture input systems described with reference to FIGS. 1-7. In this example, the SMI sensor 810 may include a VCSEL 812 with an extrinsic on-chip RCPD 814. As an example, the RCPD 814 may form a disc around the VCSEL 812.

Figure 8C:
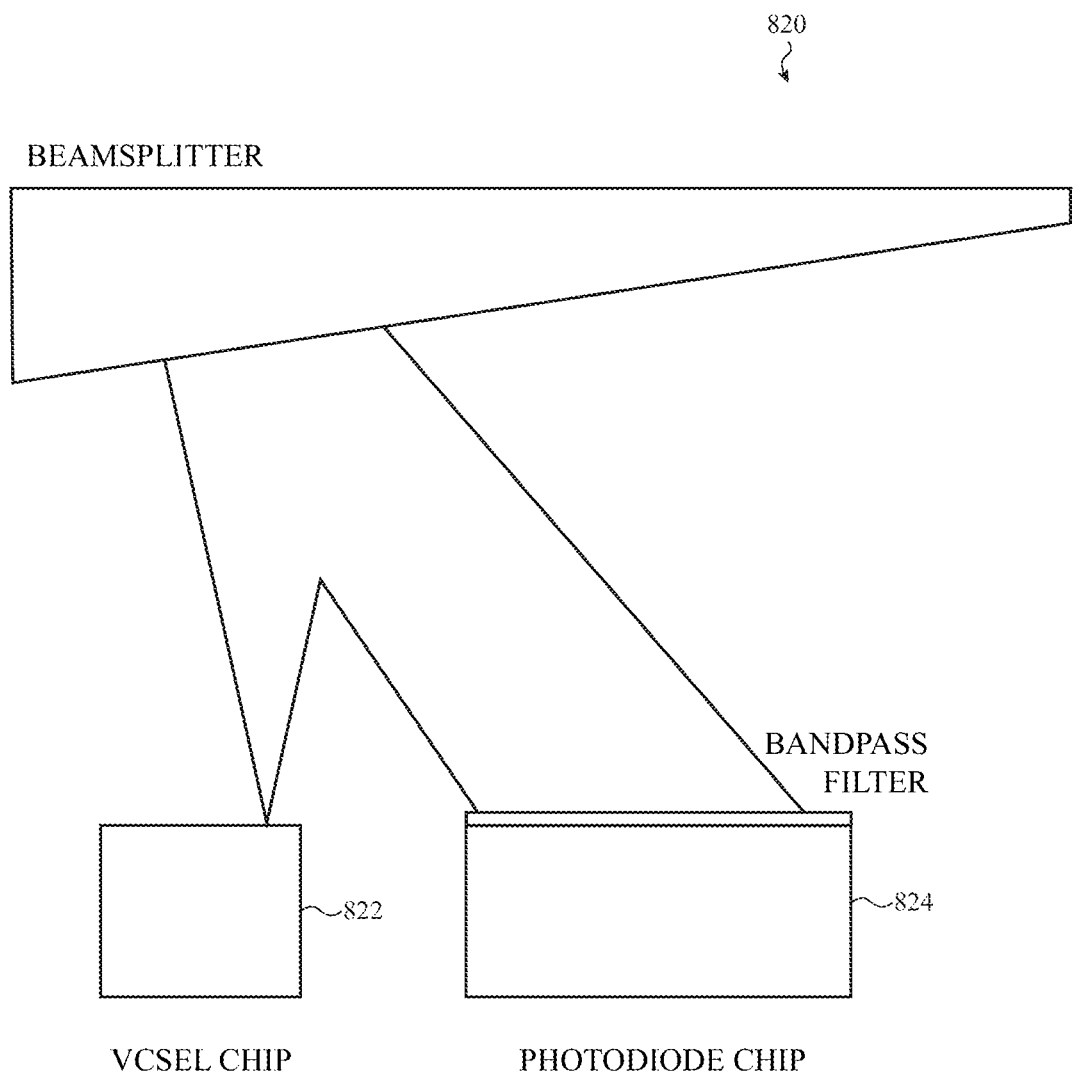

FIG. 8C shows a third example SMI sensor 820 that may be used in one or more of the SMI-based gesture input systems described with reference to FIGS. 1-7. In this example, the SMI sensor 820 may include a VCSEL 822 with an extrinsic off-chip photodetector 824.

Figure 8D:
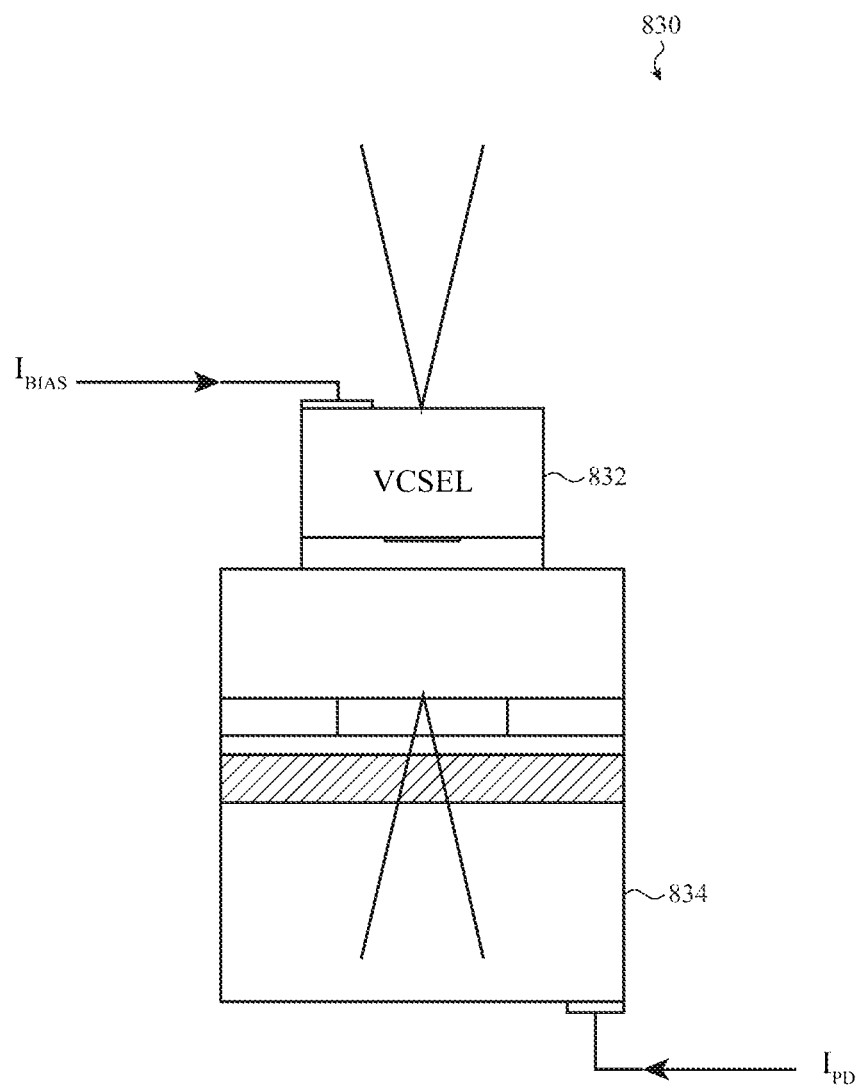

FIG. 8D shows a fourth example SMI sensor 830 that may be used in one or more of the SMI-based gesture input systems described with reference to FIGS. 1-7. In this example, the SMI sensor 830 may include a dual-emitting VCSEL 832 with an extrinsic off-chip photodetector 834. For example, the top emission may be emitted towards optics and/or another target and the bottom emission may be provided to the extrinsic off-chip photodetector 834.

Figure 9A:
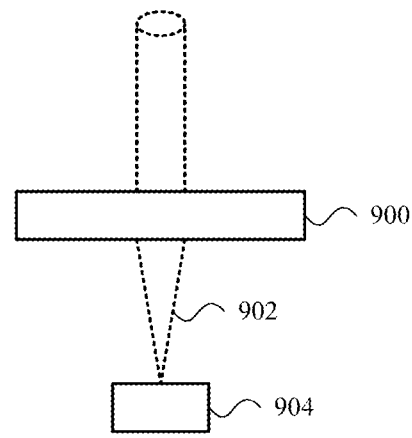
FIGS. 9A-9D show different beam-shaping or beam-steering optics that may be used with any of the SMI sensors described with reference to FIGS. 1-8D.
Figure 9B:
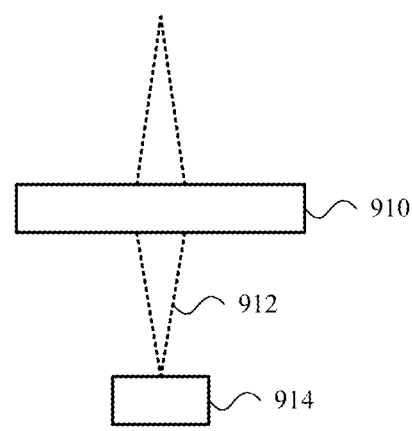
Figure 9C:
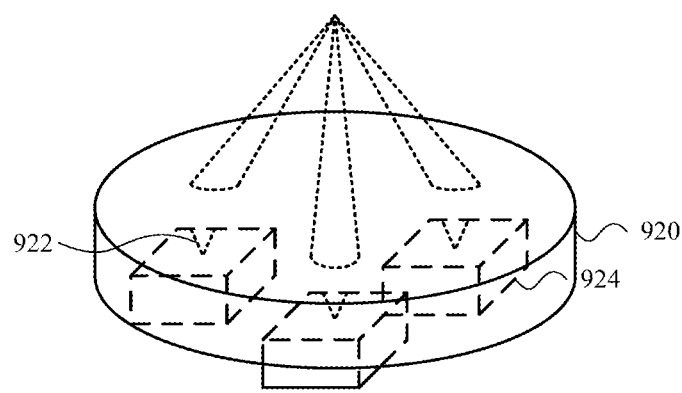
Figure 9D:
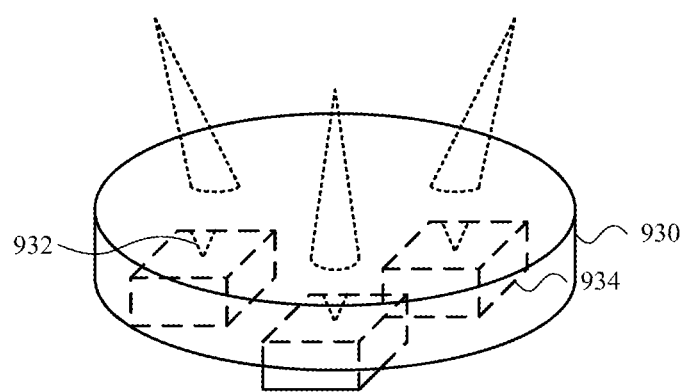

FIGS. 9A-9D show different beam-shaping or beam-steering optics that may be used with any of the SMI sensors described with reference to FIGS. 1-8D. FIG. 9A shows beam-shaping optics 900 (e.g., a lens or collimator) that collimates the beam of electromagnetic radiation 902 emitted by an SMI sensor 904. A collimated beam may be useful when the range supported by a device is relatively greater (e.g., when a device has a range of approximately ten centimeters). FIG. 9B shows beam-shaping optics 910 (e.g., a lens) that focuses the beam of electromagnetic radiation 912 emitted by an SMI sensor 914. Focusing beams of electromagnetic radiation may be useful when the range supported by a device is limited (for example, to a few centimeters). FIG. 9C shows beam-steering optics 920 (e.g., a lens or set of lenses) that directs the beams of electromagnetic radiation 922 emitted by a set of SMI sensors 924 such that the beams 922 converge. Alternatively, the SMI sensors 924 may be configured or oriented such that their beams converge without the optics 920. In some embodiments, the beam-steering optics 920 may include or be associated with beam-shaping optics, such as the beam-shaping optics described with reference to FIG. 9A or 9B. FIG. 9D shows beam-steering optics 930 (e.g., a lens or set of lenses) that directs the beams of electromagnetic radiation 932 emitted by a set of SMI sensors 934 such that the beams 932 diverge. Alternatively, the SMI sensors 934 may be configured or oriented such that their beams diverge without the optics 930. In some embodiments, the beam-steering optics 930 may include or be associated with beam-shaping optics, such as the beam-shaping optics described with reference to FIG. 9A or 9B.

Figure 10:
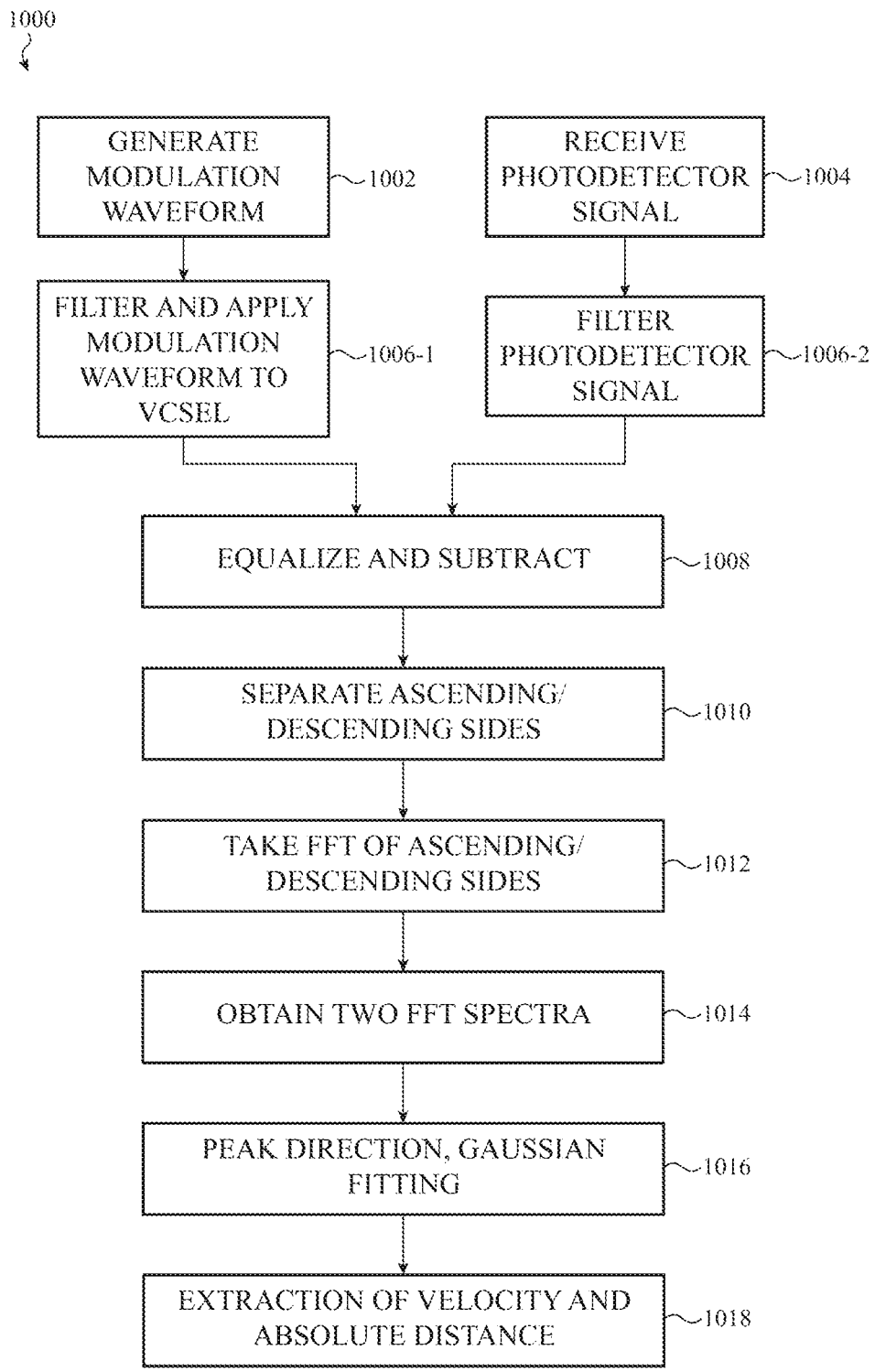
FIG. 10 shows a triangular bias procedure for determining velocity and absolute distance of a surface (or object) using self-mixing interferometry.

FIG. 10 shows a triangular bias procedure 1000 for determining velocity and absolute distance of a surface (or object) using self-mixing interferometry. The procedure 1000 may be used by one or more of the systems or devices described with reference to FIGS. 1-7, to modulate an SMI sensor using a triangular waveform, as described, for example, with reference to FIG. 1.

At an initial stage 1002, an initial signal is generated, such as by a digital or analog signal generator. At stage 1006-1, the generated initial signal is processed as needed to produce the triangle waveform modulation current 1102 that is applied to a VCSEL (see FIG. 11). Stage 1006-1 can be, as needed, operations of a DAC (such as when the initial signal is an output of a digital step generator), low-pass filtering (such as to remove quantization noise from the DAC), and voltage-to-current conversion.

The application of the modulation current 1102 to the VCSEL induces an SMI output 1118 (i.e., a change in an interferometric property of the VCSEL). It will be assumed for simplicity of discussion that the SMI output 1118 is from a photodetector, but in other embodiments it may be from another component.

At initial stage 1004 in FIG. 10, the SMI output 1118 is received. At stage 1006-2, initial processing of the SMI output 1118 is performed as needed. Stage 1006-2 may include high-pass filtering or digital subtraction.

At stage 1008, a processor may equalize the received signals in order to match their peak-to-peak values, mean values, root-mean-square values, or any other characteristic values, if necessary. For example the SMI output 1118 may be a predominant triangle waveform component being matched to the modulation current 1102, with a smaller and higher frequency component due to changes in the interferometric property. High-pass filtering may be applied to the SMI output 1118 to obtain the component signal related to the interferometric property. Also this stage may involve separating and/or subtracting the parts of the SMI output 1118 and the modulation current 1102 corresponding to the ascending and to the descending time intervals of the modulation current 1102. This stage may include sampling the separated information.

At stages 1010 and 1012, a separate fast Fourier transform (FFT) may be first performed on the parts of the processed SMI output 1118 corresponding to the ascending and to the descending time intervals. The two FFT spectra may be analyzed at stage 1014.

At stage 1016, the FFT spectra may be further processed, such as to remove artifacts and reduce noise. Such further processing can include peak detection and Gaussian fitting around the detected peak for increased frequency precision. From the processed FFT spectra data, information regarding the absolute distance can be obtained at stage 1018.

Figure 11:
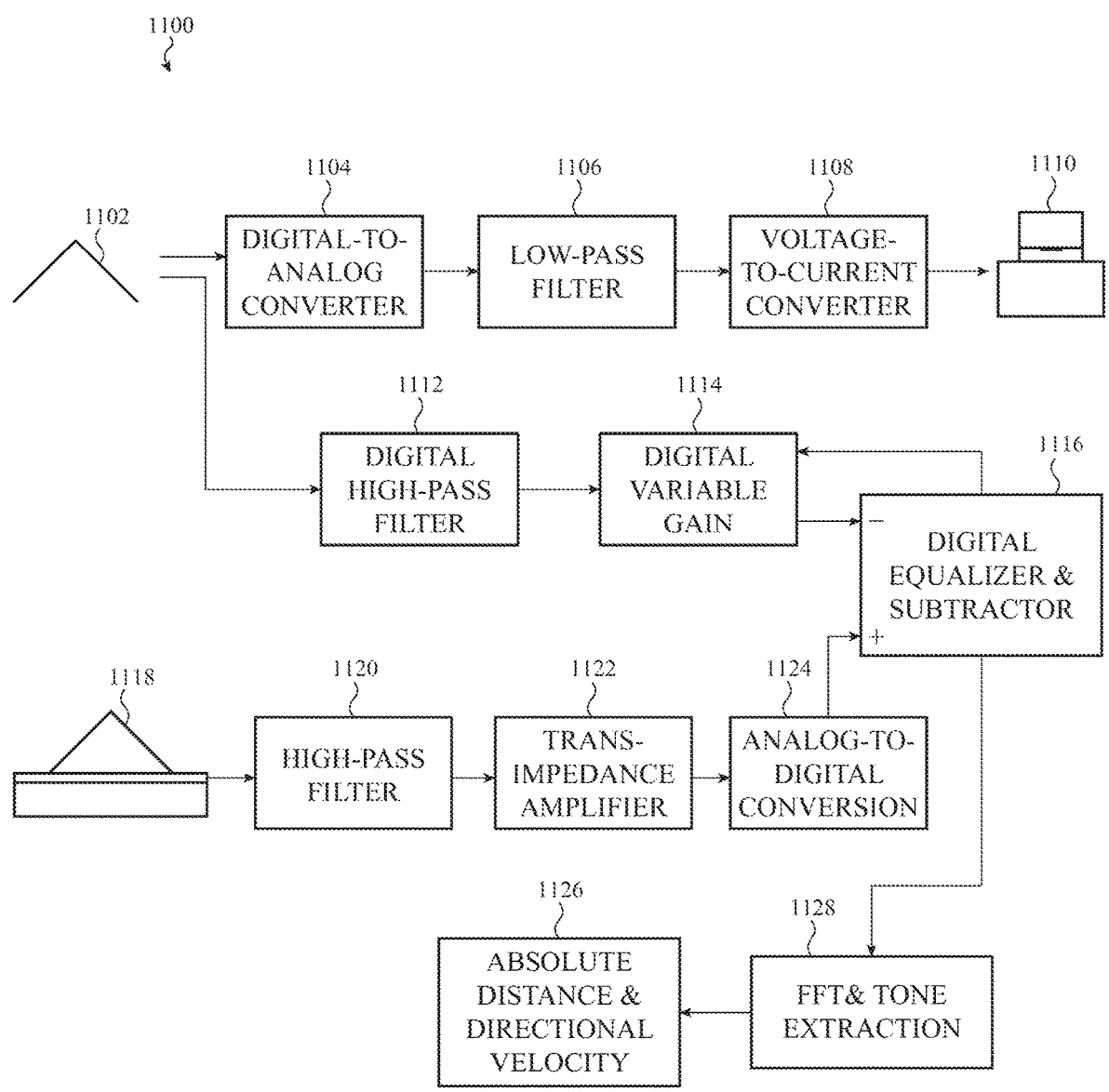
FIG. 11 depicts a block diagram of a system for implementing a spectrum analysis procedure using the procedure described with reference to FIG. 10.

FIG. 11 shows a block diagram of a system (e.g., part or all of the processing system described with reference to FIGS. 1-7) that may implement the spectrum analysis described in the method described above with respect to FIG. 10. In the exemplary system shown, the system includes generating an initial digital signal and processing it as needed to produce a modulation current 1102 as an input to the VCSEL 1110. In an illustrative example, an initial step signal may be produced by a digital generator to approximate a triangle function. The digital output values of the digital generator are used in the digital-to-analog converter (DAC) 1104. The resulting voltage signal may then be filtered by the low-pass filter 1106 to remove quantization noise. Alternatively, an analog signal generator based on an integrator can be used to generate an equivalent voltage signal directly. The filtered voltage signal then is an input to a voltage-to-current converter 1108 to produce the desired modulation current 1102 in a form for input to the VCSEL 1110.

As described above, movement of a target can cause changes in an interferometric parameter, such as a parameter of the VCSEL 1110 or of a photodetector operating in the system. The changes can be measured to produce an SMI output 1118. In the embodiment shown, it will be assumed the SMI output 1118 is measured by a photodetector. For the modulation current 1102 having the triangle waveform, the SMI output 1118 may be a triangle wave of a similar period combined with a smaller and higher frequency signal related to the interferometric property. In some cases, the SMI output 1118 may not be perfectly linear, even though the modulation current 1102 is linear. This may be a result of the bias current verses light output curve of the VCSEL 1110 being non-linear (e.g., due to non-idealities, such as self-heating effects).

The SMI output 1118 is first passed into the high-pass filter 1120, which can effectively convert the major ascending and descending ramp components of the SMI output 1118 to DC offsets. As the SMI output 1118 may typically be a current, the transimpedance amplifier 1122 can produce a corresponding voltage output (with or without amplification) for further processing.

The voltage output can then be sampled and quantized by the ADC block 1124. Before immediately applying a digital FFT to the output of the ADC block 1124, it can be helpful to apply equalization. The initial digital signal values from the digital generator used to produce the modulation current 1102 are used as input to the digital high-pass filter 1112 to produce a digital signal to correlate with the output of the ADC block 1124. An adjustable gain can be applied by the digital variable gain block 1114 to the output of the digital high-pass filter 1112.

The output of the digital variable gain block 1114 is used as one input to the digital equalizer and subtractor block 1116. The other input to the digital equalizer and subtractor block 1116 is the output of the ADC block 1124. The two signals are differenced, and used as part of a feedback to adjust the gain provided by the digital variable gain block 1114.

Equalization and subtraction may be used to clean up any remaining artifacts from the triangle that may be present in the SMI output 1118. For example, if there is a slope error or nonlinearity in the SMI output 1118, the digital high-pass filter 1112 may not fully eliminate the triangle and artifacts may remain. In such a situation, these artifacts may show up as low frequency components after the FFT and make the peak detection difficult for nearby objects. Applying equalization and subtraction may partially or fully remove these artifacts.

Once an optimal correlation is obtained by the feedback, an FFT, indicated by block 1128, can then be applied to the components of the output of the ADC block 1124 corresponding to the rising and descending side of the triangle wave. From the FFT spectra obtained, absolute distance and/or directional velocity may be inferred using the detected peak frequencies on the rising and descending sides, as discussed above and indicated by block 1126.

The method just described, and its variations, involve applying a spectrum analysis to an SMI output. However, it is understood that this is an example. In other implementations, alternate methods for determining absolute distances may be obtained directly from a time domain SMI output, without applying a spectrum analysis. Various configurations are possible and contemplated without departing from the scope of the present disclosure.

Figure 12:
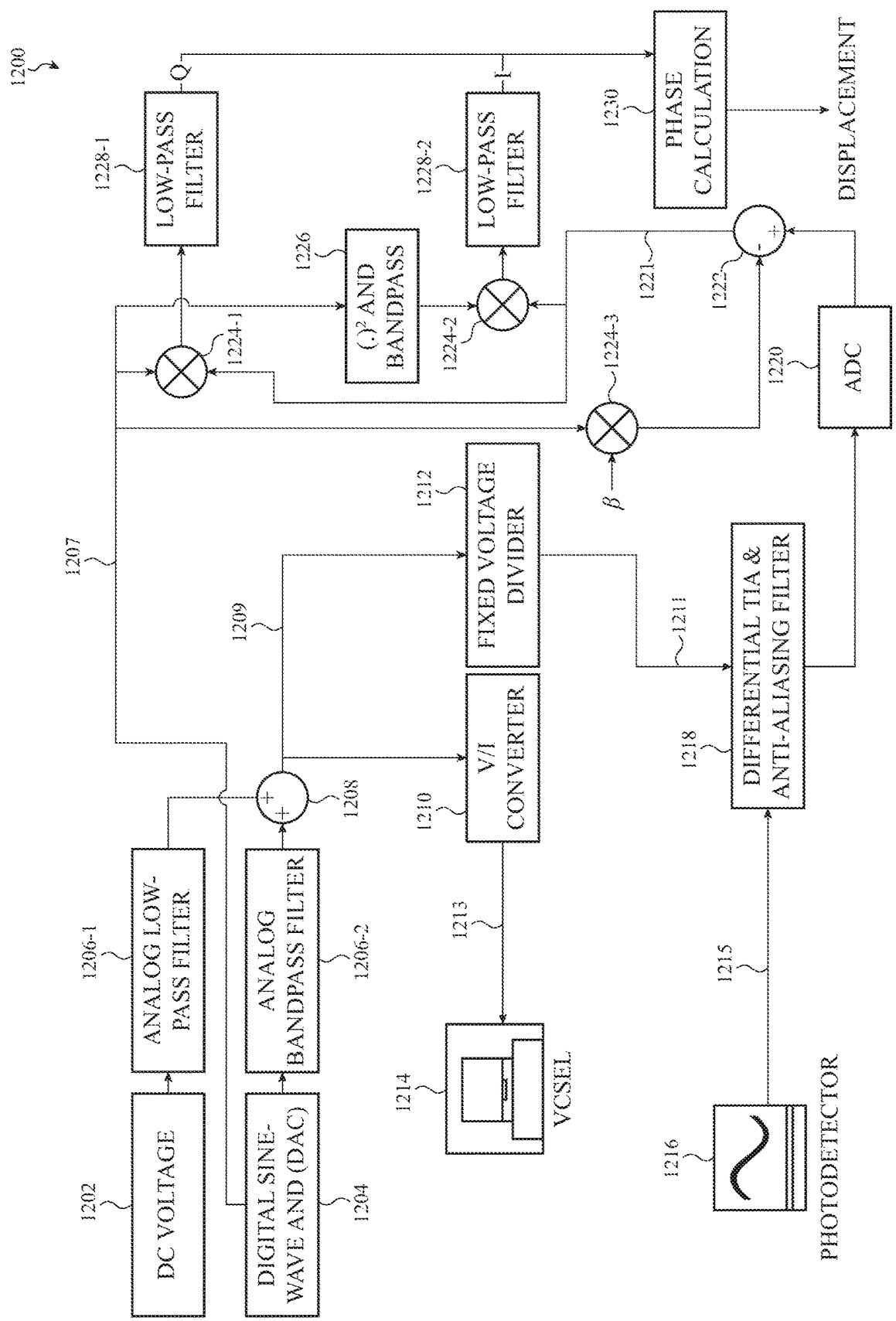
FIG. 12 shows a sinusoidal bias procedure for determining displacement of a surface (or object) using quadrature demodulation with self-mixing interferometry.

FIG. 12 shows a sinusoidal bias procedure 1200 for determining displacement of a surface (or object) using quadrature demodulation with self-mixing interferometry. The procedure 1200 may be used by one or more of the systems or devices described with reference to FIGS. 1-7, to modulate an SMI sensor using a sinusoidal waveform, as described, for example, with reference to FIG. 1.

As explained in more detail below, FIG. 12 shows components which generate and apply a sinusoidally modulated bias current to a VCSEL. The sinusoidal bias current can generate in a photodetector 1216 an output current depending on the frequency of the sinusoidal bias and the displacement to the structural component of the device. In the circuit of FIG. 12, the photodetector's 1216 output current is digitally sampled and then multiplied with a first sinusoid at the frequency of the original sinusoidal modulation of the bias current, and a second sinusoid at double that original frequency. The two separate multiplied outputs are then each low-pass filtered and the phase of the interferometric parameter may be calculated. Thereafter the displacement is determined using at least the phase.

The DC voltage generator 1202 is used to generate a constant bias voltage. A sine wave generator 1204 may produce an approximately single frequency sinusoid signal, to be combined with constant voltage. As shown in FIG. 12, the sine wave generator 1204 is a digital generator, though in other implementations it may produce an analog sine wave. The low-pass filter 1206-1 provides filtering of the output of the DC voltage generator 1202 to reduce undesired varying of the constant bias voltage. The bandpass filter 1206-2 can be used to reduce distortion and noise in the output of the sine wave generator 1204 to reduce noise, quantization or other distortions, or frequency components of its signal away from its intended modulation frequency, $\omega_m$.

The circuit adder 1208 combines the low-pass filtered constant bias voltage and the bandpass filtered sine wave to produce on link 1209 a combined voltage signal which, in the embodiment of FIG. 12, has the form $V_0 + V_m \sin(\omega_m t)$. This voltage signal is used as an input to the voltage-to-current converter 1210 to produce a current to drive the lasing action of the VCSEL 1214. The current from the voltage-to-current converter 1210 on the line 1213 can have the form $I_0 + I_m \sin(\omega_m t)$.

The VCSEL 1214 is thus driven to emit a laser light modulated as described above. Reflections of the modulated laser light may then be received back within the lasing cavity of VCSEL 1214 and cause self-mixing interference. The resulting emitted optical power of the VCSEL 1214 may be modified due to self-mixing interference, and this modification can be detected by the photodetector 1216. As described above, in such cases the photocurrent output of the photodetector 1216 on the link 1215 can have the form: $i_{PD} = i_0 + i_m \sin(\omega_m t) + \gamma \cos(\varphi_0 + \varphi_m \sin(\omega_m t))$. As the I/Q components to be used in subsequent stages are based on just the third term, the first two terms can be removed or reduced by the differential transimpedance amplifier and anti-aliasing (DTIA/AA) filter 1218. To do such a removal/reduction, a proportional or scaled value of the first two terms is produced by the voltage divider 1212. The voltage divider 1212 can use as input the combined voltage signal on the link 1209 produced by the circuit adder 1208. The output of the voltage divider 1212 on link 1211 can then have the form: $\alpha(V_0 + V_m \sin(\omega_m t))$. The photodetector current and this output of the voltage divider 1212 can be the inputs to the DTIA/AA filter 1218. The output of the DTIA/AA filter 1218 can then be, at least mostly, proportional to the third term of the photodetector current.

The output of the DTIA/AA filter 1218 may then be quantized for subsequent calculation by the ADC block 1220. Further, the output of the ADC block 1220 may have a residual signal component proportional to the sine wave originally generated by the sine wave generator 1204. To filter this residual signal component, the originally generated sine wave can be scaled (such as by the indicated factor of β) at multiplier block 1224-3, and then subtracted from the output of ADC block 1220 at subtraction block 1222. The filtered output on link 1221 may have the form: $A + B \sin(\omega_m t) + C \cos(2\omega_m t) + D \sin(3\omega D_m t) + \ldots$, from the Fourier expansion of the $\gamma \cos(\varphi_0 + \varphi_m \sin(\omega_m t))$ term discussed above. The filtered output can then be used for extraction of the I/Q components by mixing.

The digital sine wave originally generated by sine wave generator 1204 onto link 1207 is mixed (multiplied) by the multiplier block 1224-1 with the filtered output on link 1221. This product is then low-pass filtered at block 1228-1 to obtain the Q component discussed above, possibly after scaling with a number that is related to the amount of frequency modulation of the laser light and distance to the target.

Also, the originally generated digital sine wave is used as input into the squaring/filtering block 1226 to produce a digital cosine wave at a frequency double that of the originally produced digital sine wave. The digital cosine wave is then mixed (multiplied) at the multiplier block 1224-2 with the filtered output of the ADC block 1220 on link 1221. This product is then low-pass filtered at block 1228-2 to obtain the I component discussed above, possibly after scaling with a number that is related to the amount of frequency modulation of the laser light and distance to the target.

The Q and the I components are then used by the phase calculation component 1230 to obtain the phase from which the displacement of the target can be calculated, as discussed above.

One skilled in the art will appreciate that while the embodiment shown in FIG. 12 makes use of the digital form of the originally generated sine wave produced by sine wave generator 1204 onto link 1207, in other embodiments the originally generated sine wave may be an analog signal and mixed with an analog output of the DTIA/AA filter 1218. In other embodiments, the voltage divider 1212 may be a variable voltage divider. In still other embodiments, the voltage divider 1212 may be omitted and the DTIA/AA filter 1218 may be a single-ended DTIA/AA filter. In such embodiments, subtraction may be done only digitally at subtraction block 1222. In yet other embodiments, the subtraction block 1222 may be omitted and no subtraction of the modulation current may be performed.

The circuit of FIG. 12 can be adapted to implement the modified I/O method described above that uses $Q' \propto \text{Lowpass}\{I_{PD} \times \sin(3\omega_m t)\}$. Some such circuit adaptations can include directly generating both mixing signals $\sin(2\omega_m t)$ and $\sin(3\omega_m t)$, and multiplying each with the output of the output of the ADC block 1220, and then applying respective low-pass filtering, such as by the blocks 1228-1, 1228-2. The DTIA/AA filter 1218 may then be replaced by a filter to remove or greatly reduce the entire component of $I_{PD}$ at the original modulation frequency $\omega_m$. One skilled in the art will recognize other circuit adaptations for implementing this modified I/O method. For example, the signal $\sin(3\omega_m t)$ may be generated by multiplying link 1207 and the output of squaring/filtering block 1226, and subsequently performing bandpass filtering to reject frequency components other than $\sin(3\omega_m t)$.

In additional and/or alternative embodiments, the I/Q time domain based methods just described may be used with the spectrum based methods of the first family of embodiments. The spectrum methods of the first family can be used at certain times to determine the absolute distance to the target, and provide a value of $L_0$. Thereafter, during subsequent time intervals, any of the various I/Q methods just described may be used to determine $\Delta L$.

In additional and/or alternative embodiments, the spectrum methods based on triangle wave modulation of a bias current of a VCSEL may be used as a guide for the I/Q time domain methods. The I/Q methods operate optimally in the case that $J_1(b) = J_2(b)$, so that the I and Q components have the same amplitude. However, b depends on the distance L. An embodiment may apply a triangle wave modulation to the VCSEL's bias current to determine a distance to a point of interest. Then this distance is used to find the optimal peak-to-peak sinusoidal modulation of the bias current to use in an I/Q approach. Such a dual method approach may provide improved signal-to-noise ratio and displacement accuracy obtained from the I/Q method.

Figure 13:
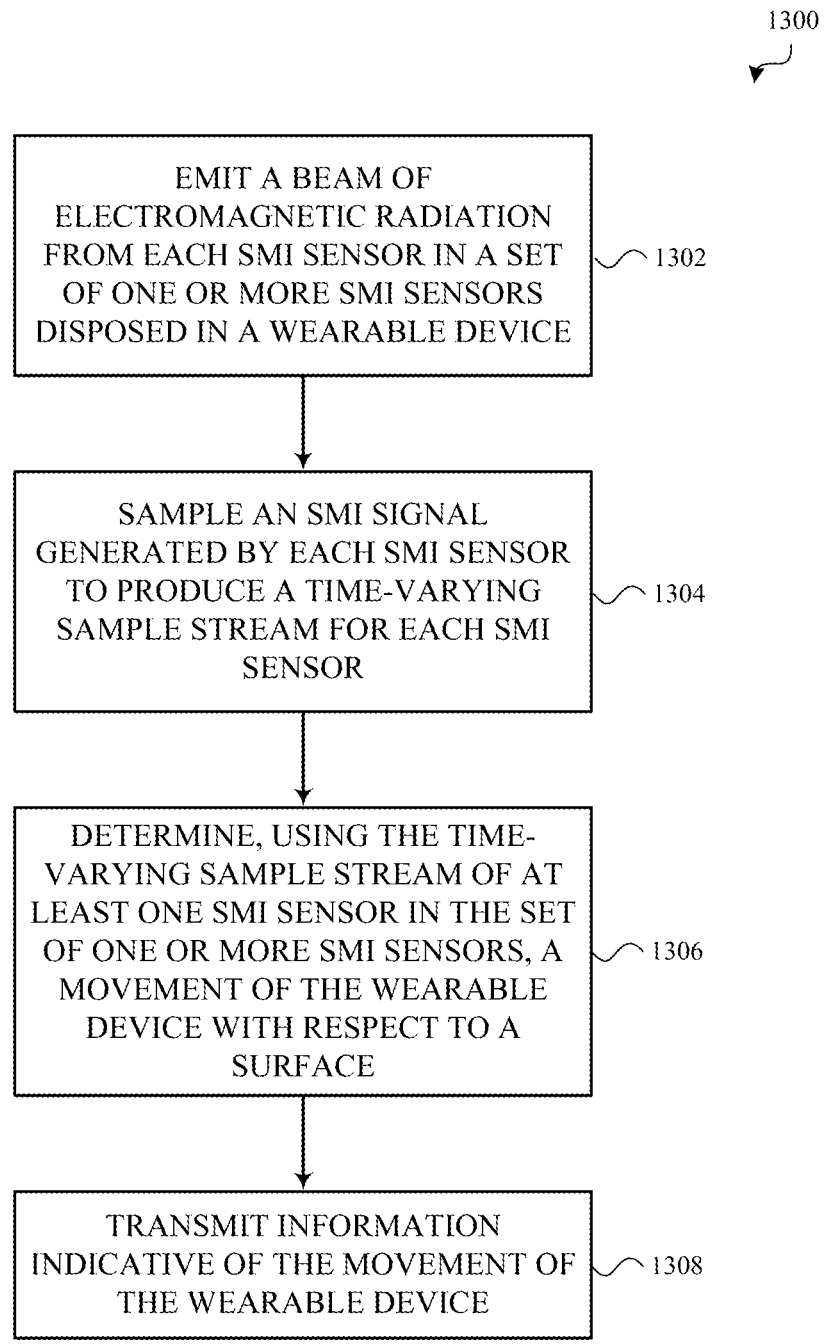
FIG. 13 shows an example method of identifying a type of gesture.

FIG. 13 shows an example method 1300 of identifying a type of gesture. The method 1300 may be performed, for example, by any of the processing systems or processors described herein.

At block 1302, the method 1300 may include emitting a beam of electromagnetic radiation from each SMI sensor in a set of one or more SMI sensors disposed in a wearable device. Alternatively, a beam of electromagnetic radiation may be emitted from each SMI sensor in a set of one or more SMI sensors disposed in a handheld device.

At block 1304, the method 1300 may include sampling an SMI signal generated by each SMI sensor to produce a time-varying sample stream for each SMI sensor.

At block 1306, the method 1300 may include determining, using a processor of the wearable device and the time-varying sample stream of at least one SMI sensor in the set of one or more SMI sensors, a movement of the wearable device (or handheld device) with respect to a surface. The operation(s) at block 1306 may also or alternatively include determining a position and/or orientation of the wearable device (or handheld device) with respect to the surface.

At block 1308, the method 1300 may include transmitting information indicative of the movement of the wearable device (or handheld device) from the wearable device (or handheld device) to a remote device.

In some embodiments, the method 1300 may include modulating an input to an SMI sensor (or to each SMI sensor) using a triangular waveform or a sinusoidal waveform. In some embodiments, the method 1300 may include modulating an input to an SMI sensor (or to each SMI sensor) using 1) a first type of modulation when producing a first subset of samples in the time-varying sample stream for the SMI sensor, and 2) a second type of modulation when producing a second subset of samples in the time-varying sample stream for the SMI sensor, where the first type of modulation is different from the second type of modulation (e.g., triangular versus sinusoidal modulation).

In some embodiments of the method 1300, the at least one SMI sensor may include three SMI sensors, and determining the movement of the wearable device (or handheld device) with respect to the surface may include determining the movement of the wearable device in 6 DoF.

In some embodiments of the method 1300, the set of one or more SMI sensors includes multiple SMI sensors, and the method 1300 may include analyzing the time-varying sample streams produced for the multiple SMI sensors, and identifying, based at least in part on the analyzing, the at least one SMI sensor used to determine the movement of the wearable device (or handheld device) with respect to the surface.

In some embodiments of the method 1300, the at least one SMI sensor may be a first subset of one or more SMI sensors, and the surface may be a first surface. In these embodiments, the method 1300 may include determining, using the processor of the wearable device (or handheld device) and the time-varying sample stream of a second subset of one or more SMI sensors in the set of one or more SMI sensors, a movement of the wearable device (or handheld device) with respect to a second surface.

Figure 14:
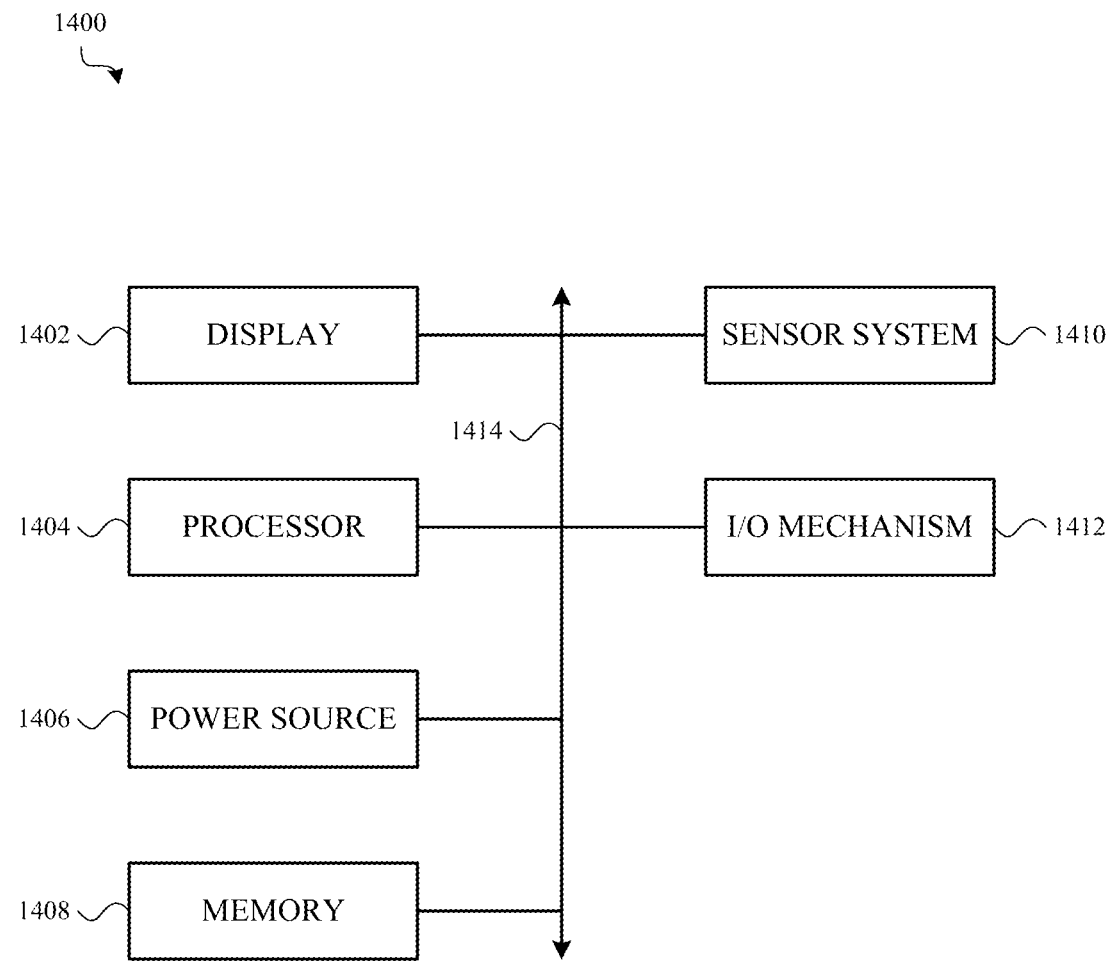
FIG. 14 shows an example electrical block diagram of an electronic device.

FIG. 14 shows a sample electrical block diagram of an electronic device 1400, which electronic device may in some cases be implemented as any of the devices described with reference to FIGS. 1-7 and 13. The electronic device 1400 may include an electronic display 1402 (e.g., a light-emitting display), a processor 1404, a power source 1406, a memory 1408 or storage device, a sensor system 1410, or an input/output (I/O) mechanism 1412 (e.g., an input/output device, input/output port, or haptic input/output interface). The processor 1404 may control some or all of the operations of the electronic device 1400. The processor 1404 may communicate, either directly or indirectly, with some or all of the other components of the electronic device 1400. For example, a system bus or other communication mechanism 1414 can provide communication between the electronic display 1402, the processor 1404, the power source 1406, the memory 1408, the sensor system 1410, and the I/O mechanism 1412.

The processor 1404 may be implemented as any electronic device capable of processing, receiving, or transmitting data or instructions, whether such data or instructions is in the form of software or firmware or otherwise encoded. For example, the processor 1404 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 1404 may provide part or all of the processing systems or processors described with reference to any of FIGS. 1-7 and 10-13.

It should be noted that the components of the electronic device 1400 can be controlled by multiple processors. For example, select components of the electronic device 1400 (e.g., the sensor system 1410) may be controlled by a first processor and other components of the electronic device 1400 (e.g., the electronic display 1402) may be controlled by a second processor, where the first and second processors may or may not be in communication with each other.

The power source 1406 can be implemented with any device capable of providing energy to the electronic device 1400. For example, the power source 1406 may include one or more batteries or rechargeable batteries. Additionally or alternatively, the power source 1406 may include a power connector or power cord that connects the electronic device 1400 to another power source, such as a wall outlet.

The memory 1408 may store electronic data that can be used by the electronic device 1400. For example, the memory 1408 may store electrical data or content such as, for example, audio and video files, documents and applications, device settings and user preferences, timing signals, control signals, and data structures or databases. The memory 1408 may include any type of memory. By way of example only, the memory 1408 may include random access memory, read-only memory, Flash memory, removable memory, other types of storage elements, or combinations of such memory types.

The electronic device 1400 may also include one or more sensor systems 1410 positioned almost anywhere on the electronic device 1400. In some cases, the sensor systems 1410 may include one or more SMI sensors, positioned as described with reference to any of FIGS. 1-13. The sensor system(s) 1410 may be configured to sense one or more types of parameters, such as but not limited to, vibration; light; touch; force; heat; movement; relative motion; biometric data (e.g., biological parameters) of a user; air quality; proximity; position; connectedness; and so on. By way of example, the sensor system(s) 1410 may include an SMI sensor, a heat sensor, a position sensor, a light or optical sensor, an accelerometer, a pressure transducer, a gyroscope, a magnetometer, a health monitoring sensor, and an air quality sensor, and so on. Additionally, the one or more sensor systems 1410 may utilize any suitable sensing technology, including, but not limited to, interferometric, magnetic, capacitive, ultrasonic, resistive, optical, acoustic, piezoelectric, or thermal technologies.

The I/O mechanism 1412 may transmit or receive data from a user or another electronic device. The I/O mechanism 1412 may include the electronic display 1402, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1412 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A wearable device, comprising:
a device housing configured to be worn by a user;
a set of self-mixing interferometry (SMI) sensors mounted within the device housing and configured to:
emit a set of beams of electromagnetic radiation; and
generate a set of SMI signals containing information about the user in relation to a surface; and
a processor configured to,
generate sets of digitized samples for the SMI signals in the set of SMI signals;
analyze the sets of digitized samples;
identify, based at least in part on the analyzing, at least one SMI signal, in the set of SMI signals, from which to extract the information about the user in relation to the surface; and
extract the information about the user in relation to the surface from the digitized samples of the at least one SMI signal.

2. The wearable device of claim 1, wherein the SMI sensors comprises at least three SMI sensors.

3. The wearable device of claim 1, wherein the processor is configured to modulate an input of each SMI sensor in the set of SMI sensors using a triangular waveform.

4. The wearable device of claim 1, wherein the processor is configured to:
modulate an input of each SMI sensor in the set of SMI sensors, during a first set of time periods, using a sinusoidal waveform; and
modulate the input of each SMI sensor in the set of SMI sensors, during a second set of time periods, using a triangular waveform.

5. The wearable device of claim 2, wherein the at least three SMI sensors are configured to emit orthogonal beams of electromagnetic radiation.

6. The wearable device of claim 2, wherein the at least three SMI sensors are configured to emit beams of electromagnetic radiation that converge.

7. The wearable device of claim 1, wherein the device housing defines a closed ring configured to receive a finger.

8. The wearable device of claim 1, wherein the device housing defines an open ring configured to receive a finger.

9. The wearable device of claim 1, wherein the processor is configured to:
analyze the sets of digitized samples to determine whether different beams of electromagnetic radiation in the set of beams of electromagnetic radiation likely impinge on the surface or on different surfaces; and
identify the at least one SMI signal, from which to extract the information about the user in relation to the surface, based at least in part on a determination that each SMI signal in the at least one SMI signal corresponds to a beam of electromagnetic radiation that impinges on the surface.

10. The wearable device of claim 1, further comprising:
a wireless communications interface mounted within the device housing; wherein:
the processor is configured to transmit the information about the user in relation to the surface using the wireless communications interface.

11. A method of identifying a type of gesture, comprising:
emitting a beam of electromagnetic radiation from each self-mixing interferometry (SMI) sensor in a set of SMI sensors disposed in a wearable device;
sampling an SMI signal generated by each SMI sensor to produce a set of time-varying sample streams for the set of SMI sensors;
generating a respective set of digitized samples for each time-varying sample stream in the set of time-varying sample streams;
analyzing, using a processor of the wearable device, the respective set of digitized samples for each time-varying sample stream;
identifying, using the processor and based at least in part on the analyzing, at least one SMI signal, in the set of SMI signals, from which to extract information about a movement of the user; and
determining, using the processor and based at least in part on the at least one SMI signal, the movement of the user.

12. The method of claim 11, further comprising:
modulating an input to an SMI sensor included in the set of SMI sensors using a triangular waveform.

13. The method of claim 11, further comprising:
modulating an input to an SMI sensor included in the set of SMI sensors using,
a first type of modulation when producing a first subset of samples in the time-varying sample stream for the SMI sensor; and
a second type of modulation when producing a second subset of samples in the time-varying sample stream for the SMI sensor;
wherein the first type of modulation is different from the second type of modulation.

14. The method of claim 11, wherein:
the set of SMI sensors comprises three SMI sensors; and
determining the movement of the user comprises determining the movement of the wearable device in six degrees of freedom.

15. The method of claim 11, wherein:
analyzing the sets of digitized samples comprises determining whether different beams of electromagnetic radiation in the set of beams of electromagnetic radiation likely impinge on a same surface or different surfaces; and
identifying the at least one SMI signal, from which to extract the information about the user, is based at least in part on a determination that each SMI signal in the at least one SMI signal corresponds to a beam of electromagnetic radiation that impinges on the same surface.

16. A wearable device, comprising:
a device housing configured to be worn by a user;
a set of one or more self-mixing interferometry (SMI) sensors mounted within the device housing and configured to:
   emit a set of one or more beams of electromagnetic radiation; and
   generate a set of SMI signals containing information about the user in relation to a surface; and
a processor configured to,
   modulate an input of each SMI sensor of the set of SMI sensors using different waveforms during different time periods;
   generate a set of digitized samples of the set of SMI signals; and
   extract the information about the user in relation to the surface from the set of digitized samples.

17. The wearable device of claim 16, wherein the information about the user in relation to the surface includes a gesture made by the user.

18. The wearable device of claim 17, wherein the information about the user in relation to the surface includes a string of alphanumeric characters formed by the user on or adjacent the surface.

19. The wearable device of claim 16, wherein the wearable device comprises a finger ring.

20. The wearable device of claim 16, wherein the input of each SMI sensor in the set of SMI sensors is modulated differently in two or more different time periods.

* * * * *